US009934754B2

(12) United States Patent
Mullins et al.

(10) Patent No.: US 9,934,754 B2
(45) Date of Patent: Apr. 3, 2018

(54) DYNAMIC SENSOR ARRAY FOR AUGMENTED REALITY SYSTEM

(71) Applicant: DAQRI, LLC, Los Angeles, CA (US)

(72) Inventors: Brian Mullins, Sierra Madre, CA (US); Matthew Kammerait, West Hollywood, CA (US)

(73) Assignee: DAQRI, LLC, Los Angeles, CA (US)

(*) Notice: Subject to any disclaimer, the term of this patent is extended or adjusted under 35 U.S.C. 154(b) by 0 days.

(21) Appl. No.: 14/870,701

(22) Filed: Sep. 30, 2015

(65) Prior Publication Data
US 2017/0092220 A1 Mar. 30, 2017

(51) Int. Cl.
G09G 5/00 (2006.01)
G06T 19/00 (2011.01)
G02B 27/01 (2006.01)
H04N 13/04 (2006.01)
G02B 27/00 (2006.01)
G06F 3/14 (2006.01)
(Continued)

(52) U.S. Cl.
CPC .......... G09G 5/003 (2013.01); G02B 27/017 (2013.01); G06T 19/006 (2013.01); G02B 27/0093 (2013.01); G02B 2027/014 (2013.01); G02B 2027/0178 (2013.01); G02B 2027/0187 (2013.01); G06F 3/14 (2013.01); G09G 3/001 (2013.01); G09G 2370/022 (2013.01); G09G 2370/16 (2013.01); H04N 13/0203 (2013.01); H04N 13/044 (2013.01); H04N 13/0484 (2013.01); H04N 2013/0074 (2013.01)

(58) Field of Classification Search
CPC ...... G02B 2027/014; G02B 2027/0178; G02B 2027/0187; G02B 27/0093; G02B 27/017; G06F 3/14; G09G 2370/022; G09G 3/001; H04N 13/0203; H04N 13/044; H04N 13/0484; H04N 2013/0074
USPC ........................................................ 345/7, 8
See application file for complete search history.

(56) References Cited

U.S. PATENT DOCUMENTS 8,854,282 B1 * 10/2014 Wong ........................ G06F 3/14
345/7
2012/0200600 A1 * 8/2012 Demaine ................. A63F 13/10
345/633

(Continued)

OTHER PUBLICATIONS

"International Application Serial No. PCT/US2016/054555, International Search Report dated Oct. 28, 2016", 4 pgs.

(Continued)

Primary Examiner — Jin-Cheng Wang
(74) Attorney, Agent, or Firm — Schwegman Lundberg & Woessner, P.A.

(57) ABSTRACT

A system and method for generating a dynamic sensor array for an augmented reality system is described. A head mounted device includes one or more sensors, an augmented reality (AR) application, and a sensor array module. The sensor array module identifies available sensors from other head mounted devices that are geographically located within a predefined area. A dynamic sensor array is formed based on the available sensors and the one or more sensors. The dynamic sensor array is updated based on an operational status of the available sensors and the one or more sensors. The AR application generates AR content based on data from the dynamic sensor array. A display of the head mounted device displays the AR content.

19 Claims, 15 Drawing Sheets

(51) Int. Cl.
  *G09G 3/00* (2006.01)
  *H04N 13/02* (2006.01)
  *H04N 13/00* (2018.01)

(56) References Cited

U.S. PATENT DOCUMENTS

2014/0171039 A1* 6/2014 Bjontegard ....... H04L 29/06034
  455/414.1
2015/0054826 A1* 2/2015 Varga ..................... F41G 3/04
  345/421

OTHER PUBLICATIONS

"International Application Serial No. PCT/US2016/054555, Written Opinion dated Oct. 28, 2016", 8 pgs.

* cited by examiner

DYNAMIC SENSOR ARRAY FOR AUGMENTED REALITY SYSTEM

TECHNICAL FIELD

The subject matter disclosed herein generally relates to the processing of data. Specifically, the present disclosure addresses systems and methods for forming a dynamic sensor array from multiple sensors of head mounted devices in combination with fixed or mobile sensors in the same environment.

BACKGROUND

A device can be used to generate and display data in addition to an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision and object recognition) the information about the surrounding real world of the user becomes interactive. Device-generated (e.g., artificial) information about the environment and its objects can be overlaid on the real world. However, sensors in devices can fail and thereby render the devices inoperable.

BRIEF DESCRIPTION OF THE DRAWINGS

Some embodiments are illustrated by way of example and not limitation in the figures of the accompanying drawings.

DETAILED DESCRIPTION

Figure 1:
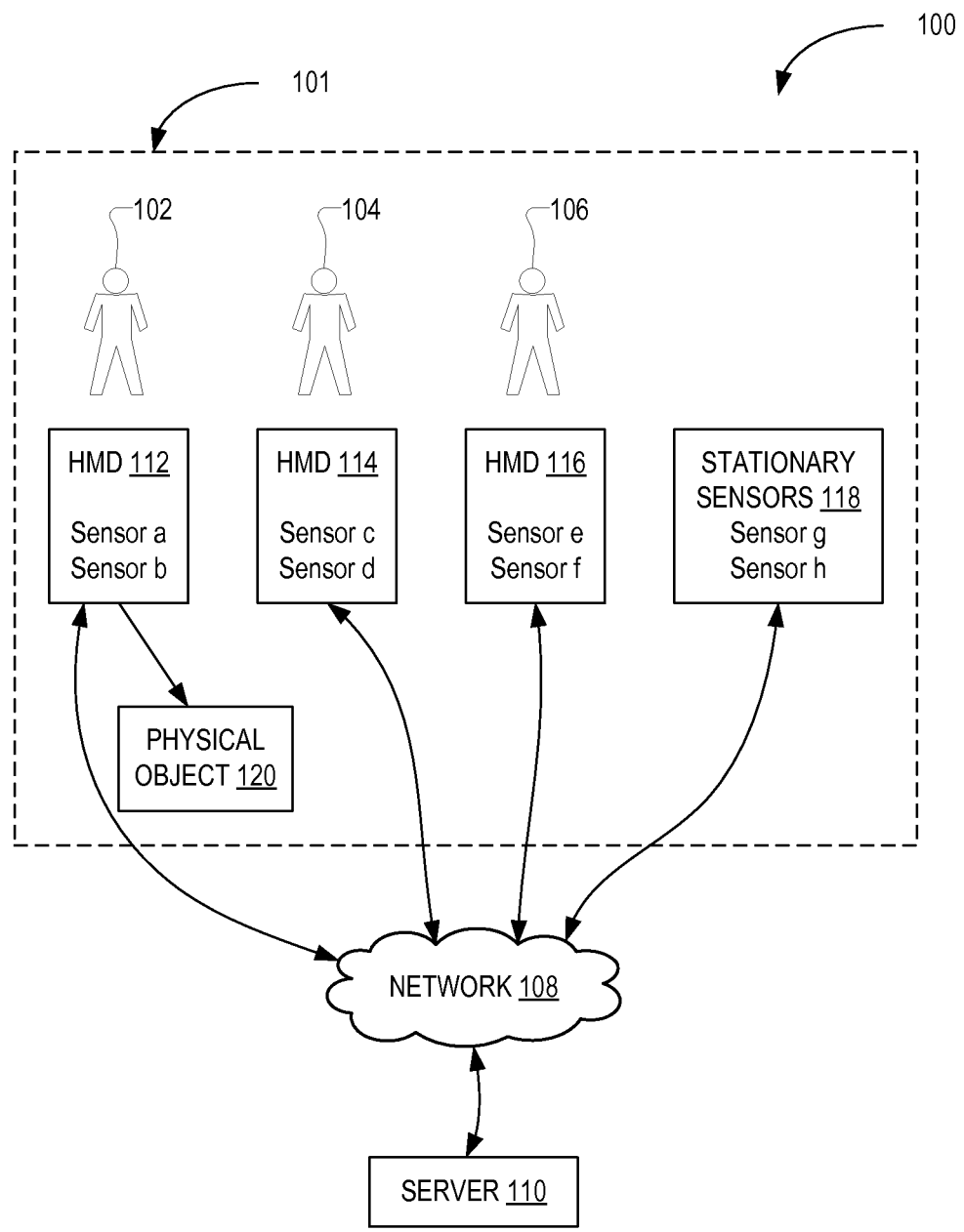
FIG. 1 is a block diagram illustrating an example of a network environment suitable for a dynamic sensor array, according to some example embodiments.

Example methods and systems are directed to a dynamic sensor array for augmented reality (AR) systems. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a virtual object (e.g., a three-dimensional model of a virtual dinosaur) overlaid on an image of a real world physical object (e.g., a billboard) captured by a camera of a viewing device. The viewing device may include a handheld device such as a tablet or smartphone, or a wearable device such as a head mounted device (HMD) (e.g., helmet, glasses). The virtual object may be displayed in a transparent or clear display (e.g., see-through display) of the viewing device or a non-transparent screen of the viewing device. The physical object may include a visual reference (e.g., uniquely identifiable pattern on the billboard) that the AR application can recognize. A visualization of the additional information, such as the virtual object overlaid or engaged with an image of the physical object is generated in the display of the viewing device. The viewing device generates the virtual object based on the recognized visual reference (e.g., QR code) or captured image of the physical object (e.g, image of a logo). The viewing device displays the virtual object based on a relative position between the viewing device and the visual reference. For example, a virtual dinosaur appears closer and bigger when the viewing device is held closer to the visual reference associated with the virtual dinosaur. Similarly, the virtual dinosaur appears smaller and farther when the viewing device is moved further away from the virtual reference associated with the virtual dinosaur. The virtual object may include a three-dimensional model of a virtual object or a two-dimensional model of a virtual object. For example, the three-dimensional model includes a three-dimensional view of a chair. The two-dimensional model includes a two-dimensional view of a dialog box, menu, or written information such as statistics information for a baseball player. The viewing device renders an image of the three-dimensional or two-dimensional model of the virtual object in the display of the viewing device.

The viewing device typically includes sensors such as cameras, thermometers, infrared sensors, barometers, or humidity sensors. Those of ordinary skill in the art will recognize that other types of sensors can be included in the viewing device. A sensor in the viewing device can fail and render the viewing device inoperable. In a situation where a sensor of the viewing device is unavailable or not operating, the viewing device queries the status of sensors from other viewing devices located nearby (e.g., within a predefined radius or geographic area such as a building or campus). In another example, the viewing sensor queries the status of sensors from other viewing devices associated with the viewing device regardless of distance or physical proximity (e.g., other viewing devices associated with a same organization of the viewing device). The viewing device then forms or generates a dynamic sensor array that includes the available and operational sensors from the other viewing devices. The viewing device with the defective sensor then identifies a sensor from the dynamic sensor array that is comparable or performs a similar function to that of the defective sensor. In another example embodiment, the viewing device with the defective sensor identifies the closest viewing device with an operating sensor comparable to the defective sensor. For example, the viewing device identifies a thermometer from another viewing device located within a same room when the defective sensor of the viewing device includes a thermometer. In another example, the viewing device identifies a barometer of another viewing device located on the same floor of a building when the defective sensor of the viewing device is a barometer. Once the viewing device identifies a substitute sensor from the dynamic sensor array to be used to replace the defective sensor, the viewing device accesses data from the substitute sensor of the other viewing devices to generate AR content. In this example, the viewing device accesses data from other sensors to replace the missing data from the defective sensor in the viewing device and generate AR content based on the data from the substitute sensor of the other viewing devices.

In another example embodiment, the viewing device identifies one or more sensors, from the dynamic sensor array, that perform similar functions to a sensor in the viewing device. For example, thermometers in other viewing devices perform the same function as the thermometer in the viewing device (e.g., they measure a temperature— ambient or local). Using the thermometer example, the viewing device identifies one or more thermometers from other viewing devices located within a same room. Once the viewing device identifies the additional sensors from the dynamic sensor array, the viewing device accesses data from the additional sensors of the other viewing devices to generate AR content. For example, the viewing device may compute an average of the temperature measured by the thermometers of the other viewing devices and the temperature measured by the thermometer of the viewing device located in the same room. The viewing device may then use the computed average temperature to generate AR content. In this example, the viewing device accesses data from other sensors to supplement the data from the sensor in the viewing device and generate AR content based on those data.

In another example embodiment, the viewing device identifies one or more sensors from the dynamic sensor array that performs different functions to a sensor in the viewing device. For example, a barometer in another viewing device performs a different function from the thermometer in the viewing device (e.g., the barometer measures pressure while the thermometer measures a temperature). Using the barometer example, the viewing device identifies a barometer from another viewing device located within a same room. Once the viewing device identifies the additional sensors (that perform functions different from the function of the sensor in the viewing device) from the dynamic sensor array, the viewing device accesses data from the additional sensors of the other viewing devices to generate AR content. For example, the viewing device may access a temperature of a room from a thermometer in the viewing device, and a pressure of the room from a barometer in another viewing device located in the same room. The viewing device may then use the temperature and pressure in the room to generate AR content. In this example, the viewing device accesses data from other sensors to complement the data from the sensor in the viewing device and generate AR content based on those data.

In another example embodiment, the viewing device identifies one or more sensors from the dynamic sensor array based on a context of the viewing device. The context may include, for example, a task within an AR application (e.g., changing a filter of an engine), a location of the viewing device (e.g., factory building A), or user privileges (e.g., user of the viewing device is an executive of a company). Those of ordinary skills in the art will recognize that the context may be determined based other factors such as a usage time and location of the viewing device. Once the viewing device identifies the sensors (also referred to as context sensors) from the dynamic sensor array based on the context of the viewing device, the viewing device accesses data from the context sensors of the other viewing devices to generate AR content. For example, the viewing device may access temperature data from a valve in a room when the location of the viewing device shows that it is approaching the room. The viewing device may then generate AR content based on the temperature data of the valve. In this example, the viewing device would display, for example, color indicators overlaid on a door of the room to indicate the temperature of the valve in the room prior to the user of the viewing device entering the room.

In another example embodiment, a server communicates with several viewing devices that are located within a same geographic region (e.g., a floor or building). The server may also communicate with stationary, mobile, robotic, or aerial sensors within a physical location (e.g., a smoke sensor affixed to the ceiling of a room, a barometer affixed to a wall in a room). The server sends a query to the viewing devices and the stationary sensors to determine their status and availability. The server then identifies sensors that are operational and available from the viewing devices and stationary sensors to form a dynamic sensor array. The sensor array is dynamic because the sensory array is updated based on the operational status of the sensors. For example, the server periodically queries the status of a sensor and determines that a sensor has become defective. The server then updates the sensor array to reflect the defective status of the sensor. In another example, the server determines that a viewing device has left the room or moved away to another building. In that case, the server updates the sensor array and removes the sensors from the viewing device that has left the room, from the sensor array.

A system and method for operating a dynamic sensor array for an AR system is described. A HMD includes one or more sensors, an augmented reality (AR) application, and a sensor array module. The sensor array module identifies available sensors from other HMDs that are geographically located within a predefined area. A dynamic sensor array is formed based on the available sensors of the other HMDs and the one or more sensors of the HMD. The viewing device periodically updates the dynamic sensor array based on an operational status of the available sensors and the one or more sensors. The viewing device periodically queries the sensors to determine their operational status. The AR application generates AR content based on data from the dynamic sensor array. A display in the HMD displays the AR content.

In another example embodiment, a server includes a sensor array module configured to identify HMDs geographically located within a predefined area (e.g., within a campus or within a distance radius of the server, a building, or a particular HMD), identify available sensors from the HMDs, form a dynamic sensor array based on the available sensors, update the dynamic sensor array based on an operational status of the available sensors, and provide data from one or more sensors of the dynamic sensor array to a HMD. The HMD generates AR content based on the data from the dynamic sensor array.

In another example embodiment, the sensor array module operates based on efficient duty cycle management, queueing, power management, and is configured to create virtual sensors that combine 2 or more existing sensors into a previously unavailable configuration.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a network environment 100 suitable for a dynamic sensor array, according to some example embodiments. The network environment 100 includes HMDs 112, 114, 116, stationary sensors 118, and a server 110, communicatively coupled to each other via a network 108. The HMDs 112, 114, 116 and the server 110 may each be implemented in a computer system, in whole or in part, as described below with respect to FIG. 17 or in a mobile device as described with respect to FIG. 18. The server 110 may be part of a network-based system. For example, the network-based system may be or include a cloud-based server system that provides additional information, such as three-dimensional models, to the HMDs.

Each HMD 112, 114, 116 has a respective user 102, 104, and 106. The user 102, 104, or 106 may be a human user (e.g., a human being), a machine user (e.g., a computer configured by a software program to interact with the HMDs 112, 114, 116), or any suitable combination thereof (e.g., a human assisted by a machine or a machine supervised by a human). The user 102 is not part of the network environment 100, but is associated with the HMD 112 and may be a user of the HMD 112. The HMD 112 includes a computing device with a display such as a wearable computing device (e.g., watch or glasses). In one example, the HMD 112 includes a display screen that displays what is captured with a camera of the HMD 112. In another example, a display of the HMD 112 may be transparent such as in lenses of wearable computing glasses or a visor of a helmet. The HMD 112 may be removable mounted to a head of the user 102. In another example, other computing devices that are not head mounted may be used instead of the HMD 112. For example, the other computing devices may include handheld devices such as smartphones and tablet computers. Other computing devices that are not head mounted may include devices with a transparent display such as a windshield of a car or plane.

Each HMD 112, 114, 116 include a set of sensors. For example, HMD 112 includes sensors a and b, HMD 114 includes sensors c and d, HMD 116 includes sensor e and f. The sensors can perform similar function (e.g., measure temperature) or different functions (e.g., measure pressure vs measure temperature). For example, sensor a and b of HMD 112 include the same type of sensors from sensors e and f of HMD 116. In another example, sensor a and b of HMD 112 include the different type of sensors that perform different functions from those of sensors e and f of HMD 116. In another example, sensor a of HMD 112 and sensor e of HMD 116 perform the same function while sensor b of HMD 112 and sensor f of HMD 116 each perform different functions (e.g., sensor b measures pressure, sensor f measure humidity) than those of sensors a and e (e.g., measure temperature).

Stationary sensors 118 include stationary positioned sensors that are affixed to the physical environment. For example, stationary sensors 118 include a thermometer on a wall or a smoke detector in a ceiling of a room. Sensors in the stationary sensors 118 can perform similar function (e.g., measure temperature) or different functions (e.g., measure pressure vs measure temperature) from the sensors in HMDs 112, 114, and 116. In another example embodiment, the tracking sensors 112 may be used to track the location and orientation of the HMD 112 externally without having to rely on the sensors internal to the HMD 112. The stationary sensors 118 may include optical sensors (e.g., depth-enabled 3D camera), wireless sensors (Bluetooth, wifi), GPS sensor, and audio sensor to determine the location of the user 102 with the HMD 112, distance of the user 102 to the stationary sensors 118 in the physical environment (e.g., sensors placed in corners of a venue or a room), the orientation of the HMD 112 to track what the user 102 is looking at (e.g., direction at which the HMD 112 is pointed, HMD 112 pointed towards a player on a tennis court, HMD 112 pointed at a person in a room). The HMDs and corresponding user may all be located within a same geographic area 101 (e.g., a building, a floor, a campus, a room).

The user 102 may be a user of an AR application in the HMD 112. The AR application provides the user 102 with an experience triggered by a physical object 120, such as, a two-dimensional physical object (e.g., a picture), a three-dimensional physical object (e.g., a statue), a location (e.g., at lobby of a casino), or any references (e.g., perceived corners of walls or furniture) in the real world physical environment. For example, the user 102 may point the HMD 112 towards the physical object 120 and capture an image of the physical object 120. The image is tracked and recognized locally in the HMD 112 using a local context recognition dataset of the AR application of the HMD 112. The local context recognition dataset module includes a library of virtual objects associated with real-world physical objects or references. The AR application then generates additional information (e.g., a three-dimensional model) corresponding to the image of the physical object 120 and presents this additional information in a display of the HMD 112 in response to identifying the recognized image. In other embodiments, the additional information may be presented to the user via other means such as audio, haptic feedback. If the captured image is not recognized locally at the HMD 112, the HMD 112 downloads additional information (e.g., the three-dimensional model) corresponding to the captured image, from a database of the server 110 over the network 108.

In one example embodiment, the computing resources of the server 110 may be used to determine and render virtual objects based on the tracking data (generated internally with sensors from the HMDs or externally with the stationary sensors 118). The augmented reality rendering is therefore performed on the server 110 and streamed to the HMDs. As such, the HMDs do not have to compute and render any virtual object and may display the already rendered virtual object in a display of the corresponding HMD.

In another example embodiment, data from sensors in the HMD 112, stationary sensors 118, and the AR application in each HMD 112 may be used for analytics data processing at the server 110 for analysis on usage and how the user 102 is interacting with the physical environment, and in particular, which types are sensors are most often used. For example, the analytics data may track at what the locations (e.g., points or features) on the physical or virtual object the user 102 has looked, how long the user 102 has looked at each location on the physical or virtual object, how the user 102 held the HMD 112 when looking at the physical or virtual object, which features of the virtual object the user 102 interacted with (e.g., such as whether a user 102 tapped on a link in the virtual object), and any suitable combination thereof. In another example, the analytics data identifies that the user 102 is an audit worker whose primary job duty is to monitor and audit the temperature of valves in a factory and has measured valve temperature in the morning weekdays. The analytics data may be used to generate a morning query of the operational status of thermometers in HMD 112 and other HMDs 114, 116, and in the stationary sensors 118 to ensure that those thermometers are operational and to prioritize allocation of these sensor resources external to the HMD 112 as a backup in case the thermometer in HMD 112 fails to operate. In another example, the analytics data may be used to identify which sensors are most often used with which physical object. The HMD 112 may just use an optical sensor when viewing a chair to display augmented information (e.g., weight, price) related to the chair. The HMD 112 may other sensors, such as an infrared sensor, when viewing a passenger unboarding a plane to display augmented information (e.g., temperature, fever present) related to the passenger.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 12-16. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., HMDs 112, 114, 116). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
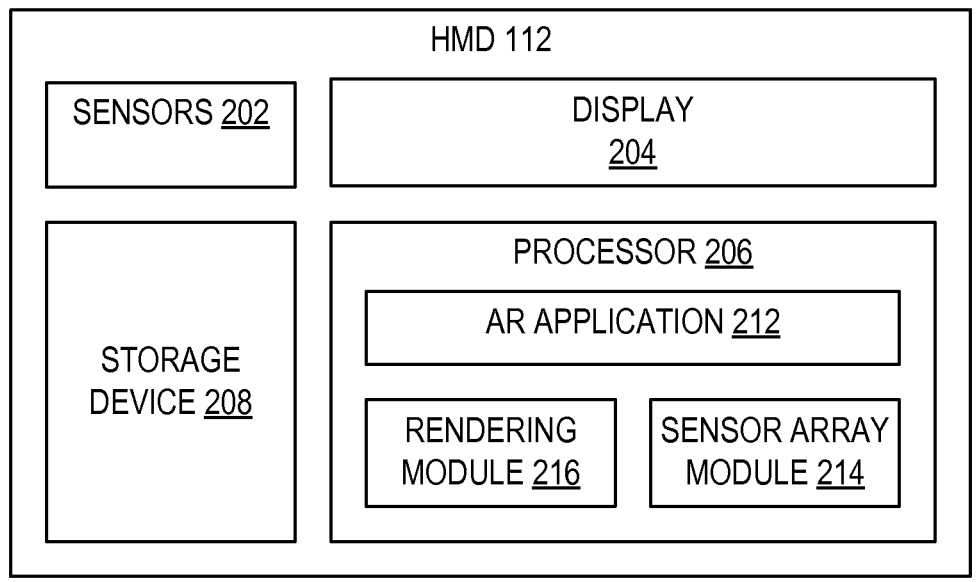
FIG. 2 is a block diagram illustrating an example embodiment of modules (e.g., components) of a head mounted device.

FIG. 2 is a block diagram illustrating an example embodiment of modules (e.g., components) of the HMD 112. The HMD 112 may include sensors 202, a display 204, a processor 206, and a storage device 208. For example, the HMD 112 may be a wearable computing device.

The sensors 202 include, for example, a thermometer, an infrared camera, a barometer, a humidity sensor, an EEG sensor, a proximity or location sensor (e.g, near field communication, GPS, Bluetooth, Wifi), an optical sensor (e.g., camera), an orientation sensor (e.g., gyroscope), an audio sensor (e.g., a microphone), or any suitable combination thereof. For example, the sensors 202 may include a rear facing camera and a front facing camera in the HMD 112. It is noted that the sensors described herein are for illustration purposes and the sensors 202 are thus not limited to the ones described.

The display 204 includes, for example, a transparent display configured to display images generated by the processor 206. In another example, the display 204 includes a touch sensitive surface to receive a user input via a contact on the touch sensitive surface.

The processor 206 includes an AR application 212, a sensor array module 214, and a rendering module 216. The AR application 212 receives data from sensors 202 (e.g., receive an image of the physical object 120) and identifies and recognizes the physical object 120 using machine-vision recognition techniques. The AR application 212 then retrieves from the storage device 208 AR content associated with the physical object 120. In one example embodiment, the AR application 112 identifies a visual reference (e.g., a logo or QR code) on the physical object (e.g., a chair) and tracks the location of the visual reference within the display 104 of the device 100. The visual reference may also be referred to as a marker and may consist of an identifiable image, symbol, letter, number, machine-readable code. For example, the visual reference may include a bar code, a quick response (QR) code, or an image that has been previously associated with the virtual object.

The sensor array module 214 determines the operational status of the sensors 202 (e.g., operational, defective, non-responsive). The sensor array module 214 can also query data from the sensors 202 on a periodic basis and determine whether the data indicates that the sensors 202 are operational. The sensor array module 214 further detects the presence of other HMDs within a same geographic area as the location of the HMD 112. In particular, the sensor array module 214 queries the other HMDs to identify which sensors in those HMDs are operational. The sensor array module 116 then forms a sensor array that includes the operating sensors from the other HMDs and the stationary sensors 118. The AR application 212 accesses data from the sensor array to generate AR content.

The rendering module 216 renders virtual objects based on data from sensors 202 and from sensor array formed by the sensor array module 116. For example, the rendering module 216 renders a display of a virtual object (e.g., a door with a color based on the temperature inside the room as detected by sensors from HMDs inside the room) based on a three-dimensional model of the virtual object (e.g., 3D model of a virtual door) associated with the physical object 120 (e.g., a physical door). In another example, the rendering module 216 generates a display of the virtual object overlaid on an image of a physical object captured by a camera of the HMD 112. The virtual object may be further manipulated (e.g., by the user) by moving the physical object relative to the HMD 112. Similarly, the display of the virtual object may be manipulated (e.g., by the user) by moving the HMD 112 relative to the physical object.

In another example embodiment, the rendering module 216 include a local rendering engine that generates a visualization of a three-dimensional virtual object overlaid (e.g., superimposed upon, or otherwise displayed in tandem with)

on an image of a physical object captured by a camera of the HMD 112 or a view of the physical object in the display 204 of the HMD 112. A visualization of the three-dimensional virtual object may be manipulated by adjusting a position of the physical object (e.g., its physical location, orientation, or both) relative to the camera of the HMD 112. Similarly, the visualization of the three-dimensional virtual object may be manipulated by adjusting a position camera of the HMD 112 relative to the physical object.

In one example embodiment, the rendering module 216 identifies the physical object (e.g., a physical telephone) based on data from the sensor array, accesses virtual functions (e.g., increase or lower the volume of a nearby television) associated with physical manipulations (e.g., lifting a physical telephone handset) of the physical object, and generates a virtual function corresponding to a physical manipulation of the physical object.

In another example embodiment, the rendering module 216 determines whether the captured image matches an image locally stored in the storage device 208 that includes a local database of images and corresponding additional information (e.g., three-dimensional model and interactive features). The rendering module 216 retrieves a primary content dataset from the server 110, generates and updates a contextual content dataset based on an image captured with the HMD 112.

The storage device 208 stores an identification of the sensors and their respective functions from the sensor array (e.g, sensor c is thermometer in HMD 114, sensor f is an accelerometer in HMD 116, sensor h is a smoke sensor in stationary sensors). The storage device 208 further includes a database of visual references (e.g., images, visual identifiers, features of images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the HMD 112 relative to the picture of the shoe. Features of the three-dimensional virtual shoe may include selectable icons on the three-dimensional virtual model of the shoe. An icon may be selected or activated using a user interface on the HMD 112.

In another example embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the rendering module 214 of the HMD 112.

The contextual content dataset includes, for example, a second set of images and corresponding experiences (e.g., three-dimensional virtual object models) retrieved from the server 110. For example, images captured with the HMD 112 that are not recognized (e.g., by the server 110) in the primary content dataset are submitted to the server 110 for recognition. If the captured image is recognized by the server 110, a corresponding experience may be downloaded at the HMD 112 and stored in the contextual content dataset. Thus, the contextual content dataset relies on the context in which the HMD 112 has been used. As such, the contextual content dataset depends on objects or images scanned by the rendering module 214 of the HMD 112.

In one embodiment, the HMD 112 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the HMD 112). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
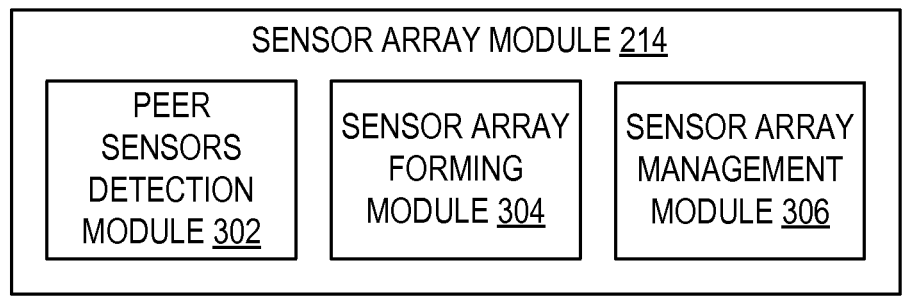
FIG. 3 is a block diagram illustrating an example embodiment of a sensor array module.

FIG. 3 is a block diagram illustrating an example embodiment of the sensor array module 214. The sensor array module 214 includes a peer sensors detection module 302, a sensor array forming module 304, and a sensor array manage module 306. The peer sensors detection module 302 identifies other HMDs that are present within the predefined geographic area 101. For example, the peer sensors detection module 302 identifies HMDs 114 and HMD 116 and stationary sensors 118 are nearby and within the same building as HMD 112. The peer sensors detection module 302 identifies other HMDs by querying the location of the HMDs and determining which HMDs are located within the same geographic area 101 as the HMD 112. In another example, the peer sensors detection module 302 filters the results from the query based on distance to the HMD 112 to determine which HMDs are nearby and closest to the HMD 112. The HMD 112 may communicate with other HMDs that belong to a same network. For example, HMDs 112, 114, and 116 may be configured to be associated with a computing network of an organization such that only HMDs 112, 114, 116 are discoverable to one another and not to HMDs outside the organization. In other examples, the HMD 112 identifies other HMDs based on other criteria besides distance such as HMD model or version number, user credentials (e.g., user 112 is an executive with access to sensitive data), user profile (e.g., user 112 is a supervisor), selected tasks in the AR application 212 (e.g., AR showing how to fix a valve).

The sensor array forming module 304 forms a sensor array that includes the operating sensors from the other HMDs and the stationary sensors 118 as determined by the peer sensors detection module 302.

The sensor array management module 306 accesses data from the sensor array to generate AR content. For example, the sensor array management module 306 access data from one or more sensor relevant to the HMD 112. The sensor array management module 306 identifies which data from which sensor to use to generate the AR content based on different situations. In a first example, the sensor management module 306 identifies a sensor (from other HMDs) similar to a defective sensor in the HMD 112. In a second example, the sensor management module 306 identifies a sensor (from other HMDs) performing a similar function to an operating sensor in the HMD 112 to enhance data from the operating sensor. In a third example, the sensor management module 306 identifies a sensor (from other HMDs) performing a different function from an operating sensor in the HMD 112. In a fourth example, the sensor management module 306 identifies a sensor (from other HMDs) based on an operating context of the HMD 112 (e.g., the context may be determined based on location and time of usage of HMD 112, user profile, operating tasks in the AR application 212)

Figure 4:
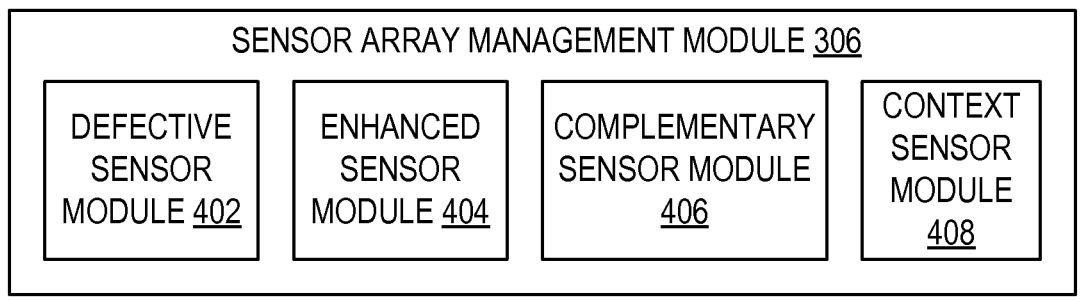
FIG. 4 is a block diagram illustrating an example embodiment of a sensor array management module.

FIG. 4 is a block diagram illustrating an example embodiment of the sensor array management module 306. The sensor array management module 306 includes a defective sensor module 402, an enhanced sensor module 404, and a complementary sensor module 406.

The defective sensor module 402 determines that a sensor in the HMD 112 is defective or otherwise non-operational. For example, a sensor is deemed non-operational if no data is received from the sensor. The defective sensor module 402 identifies the function (e.g., record audio) or type (e.g., microphone) of the defective sensor in the HMD 112. The defective sensor module 402 then identifies a sensor from the sensor array that performs a similar function. For example, the defective sensor module 402 identifies the microphone of the closest HMD to HMD 112, accesses the data from the identified microphone of the other HMD, and provides that data to the AR application 212 to generate AR content.

The enhanced sensor module 404 verifies that a sensor in the HMD 112 is operational (e.g., temperature sensor). The enhanced sensor module 404 identifies the function (e.g., measure temperature) or type (e.g., thermometer) of the sensor in the HMD 112. The enhanced sensor module 404 then identifies a sensor from the sensor array that performs a similar function. For example, the enhanced sensor module 404 identifies the temperature as measured from other HMDs in the same room as HMD 112, accesses the data measured from the other thermometers from the other HMDs, and provides that data to the AR application 212 to generate AR content. The temperatures measured by the other HMDs at different locations may be used to generate a more accurate thermal map displayed in AR content in the display 204. For example, colder areas in the room as measured by the corresponding HMDs may be colored in blue, warmer areas in the room may be colored red.

The complementary sensor module 406 verifies that a sensor in the HMD 112 is operational (e.g., camera sensor). The complementary sensor module 406 identifies the function (e.g., capture light visible to the human eye) or type (e.g., camera) of the sensor in the HMD 112. The complementary sensor module 406 then identifies a sensor from the sensor array that performs a different function from the function of the sensor in the HMD 112. For example, the complementary sensor module 406 identifies the data from infrared sensors from other HMDs in the same room as HMD 112, accesses that data, and provides the data to the AR application 212 to generate AR content. The infrared sensor data from the other HMDs may be used to generate a more comprehensive thermal map displayed in AR content in the display 204.

The context sensor module 408 determines a context of the HMD 112. The context may include, for example, a task within an AR application (e.g., changing a filter of an engine), a location of the viewing device (e.g., factory building A), or user privileges (e.g., user of the viewing device is an executive of a company). Those of ordinary skills in the art will recognize that the context may be determined based other factors such as a usage time and location of the HMD 112. Once the HMD 112 identifies the sensors (also referred to as context sensors) from the dynamic sensor array based on the context of the HMD 112, the HMD 112 accesses data from the context sensors of the other HMDs to generate AR content. For example, the HMD 112 may access temperature data from a valve in a room from other HMDs already present in the room, when the location of the HMD 112 shows that it is approaching the room. The HMD 112 may then generate AR content based on the temperature data of the valve. In this example, the HMD 112 displays, for example, color indicators overlaid on a door of the room to indicate the temperature of the valve in the room prior to the user of the HMD 112 entering the room.

Figure 5:
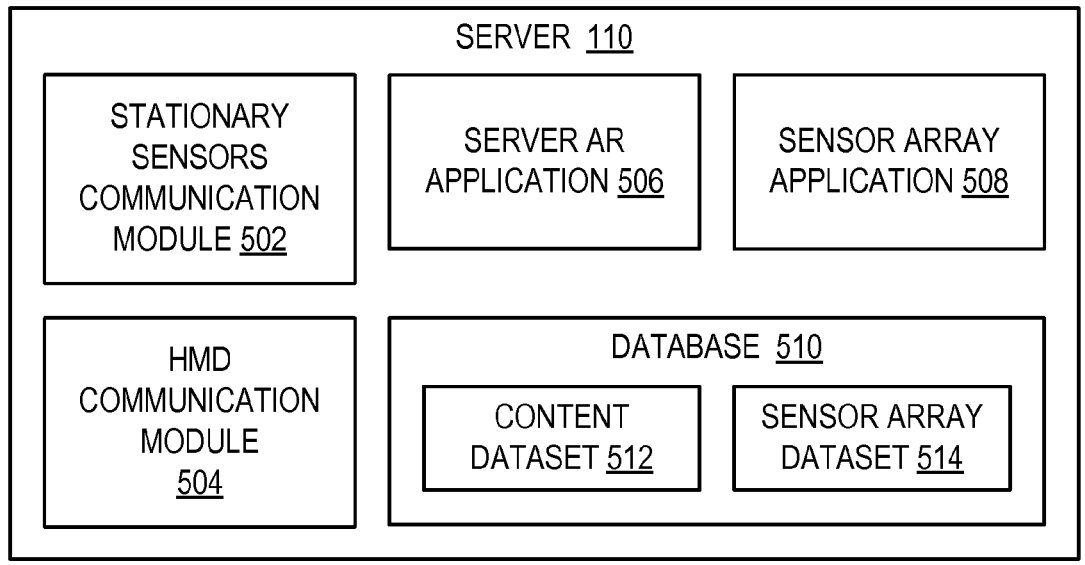
FIG. 5 is a block diagram illustrating an example embodiment of a server.

FIG. 5 is a block diagram illustrating an example embodiment of a server. The server 110 includes a stationary sensors communication module 502, a HMD communication module 504, a server AR application 506, a sensor array application 508, and a database 510. The stationary sensors communication module 502 communicates, interfaces with, and accesses data from the stationary sensors 118. The HMD communication module 504 communicates, interfaces with, and accesses data from HMDs 112, 114, and 116.

The sensory array application 508 identifies HMDs located within a predefined area, or HMDs associated with one another (e.g., HMDs belonging to a department of an organization) and stationary sensors 118 located within the same predefined geographic area of the other HMDs. The server AR application 506 identifies available and operational sensors from the HMDs 112, 114, and 116 and the stationary sensors 118 and forms form a dynamic sensor array based on the available sensors. The dynamic sensor array is updated based on an operational status of the available sensors (e.g., if one sensor becomes defective or non-operational, it is dropped from the sensor array). The server AR application 506 provides data from the dynamic sensor array to one of the HMD to generate AR content based on the data from the dynamic sensor array.

The database 510 stores a content dataset 512 and a sensor array dataset 514. The content dataset 512 may store a primary content dataset and a contextual content dataset. The primary content dataset comprises a first set of images and corresponding virtual object models. The server AR application 506 determines that a captured image received from the HMD 112 is not recognized in the content dataset 512, and generates the contextual content dataset for the HMD 112. The contextual content dataset may include a second set of images and corresponding virtual object models. The virtual content dataset includes models of virtual objects to be generated upon receiving a notification associated with an image of a corresponding physical object.

Figure 6:
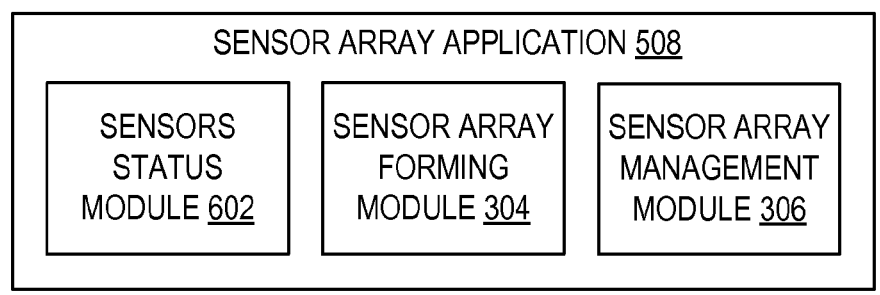
FIG. 6 is a block diagram illustrating an example embodiment of a sensor array application of the server of FIG. 5.

FIG. 6 is a block diagram illustrating an example embodiment of the sensor array application 508 of the server 110 of FIG. 5. The sensor array application 508 includes a sensor status module 602, the sensor array forming module 304 of FIG. 3, and the sensor array manage module 306 of FIG. 3. The sensor status module 602 identifies HMDs that are present within the predefined geographic area 101. For example, the sensor status module 602 identifies HMDs 112, 114, and 116 and stationary sensors 118 within a same building.

The sensor array forming module 304 forms a sensor array that includes the operating sensors from the other HMDs and the stationary sensors 118 as determined by the sensor status module 602.

The sensor array management module 306 accesses data from the sensor array to generate AR content. For example, the sensor array management module 306 access data from one or more sensor relevant to the HMD 112. The sensor array management module 306 identifies which data from which sensor to use to generate the AR content based on different situations. In a first example, the sensor management module 306 identifies a sensor (from other HMDs) similar to a defective sensor in the HMD 112. In a second example, the sensor management module 306 identifies a sensor (from other HMDs) performing a similar function to an operating sensor in the HMD 112 to enhance data from the operating sensor. In a third example, the sensor management module 306 identifies a sensor (from other HMDs) performing a different function from an operating sensor in the HMD 112. In a fourth example, the sensor management module 306 identifies a sensor (from other HMDs) based on an operating context of the HMD 112 (e.g., the context may be determined based on location and time of usage of HMD 112, user profile, operating tasks in the AR application 212). In a third example, the sensor management module 306 combines sensors with lower resolution or refresh rate to create a "virtual sensor" of a higher (e.g., combined) resolution or refresh rate that is superior to any of the available physical sensors in isolation.

Figure 7:
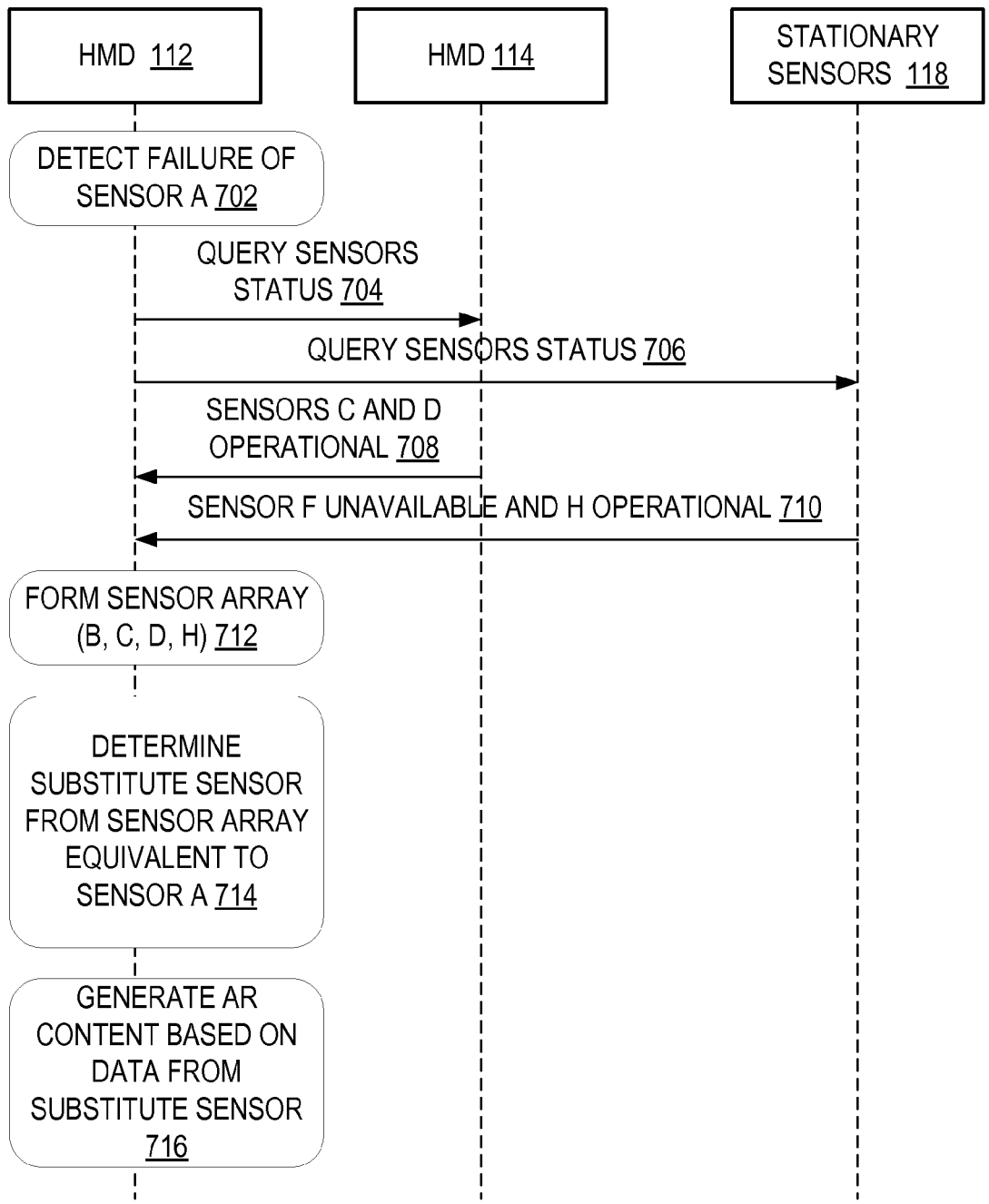
FIG. 7 is an interaction diagram illustrating a first example embodiment of an operation of a dynamic sensor array.

FIG. 7 is an interaction diagram illustrating a first example embodiment of an operation of a dynamic sensor array. At operation 702, HMD 112 determines that sensor a is failing and non-operational. In response to the determining that sensor a is defective, HMD 112 queries the status of sensors from HMD 114 and stationary sensors 118 located nearby at operations 704 and 706. At operation 708, HMD 112 receives a communication from HMD 114 indicating that sensor c and d of HMD 114 are operational. At operation 710, HMD 112 receives a communication from stationary sensors 118 indicating that sensor f is unavailable and sensor h is operational. At operation 712, HMD 112 forms a sensor array based on sensors b, c, d, and h. At operation 714, HMD 112 identifies one or more sensors (also referred to as a substitute sensor), from the sensor array, that performs a function equivalent to that of the defective sensor a. At operation 716, HMD 112 accesses data from the substitute sensor and generate AR content based on data from the substitute sensor. In one example embodiment, operations 702, 712, 714, and 716 may be implemented with the defective sensor module 402 and the AR application 212 of HMD 112.

Figure 8:
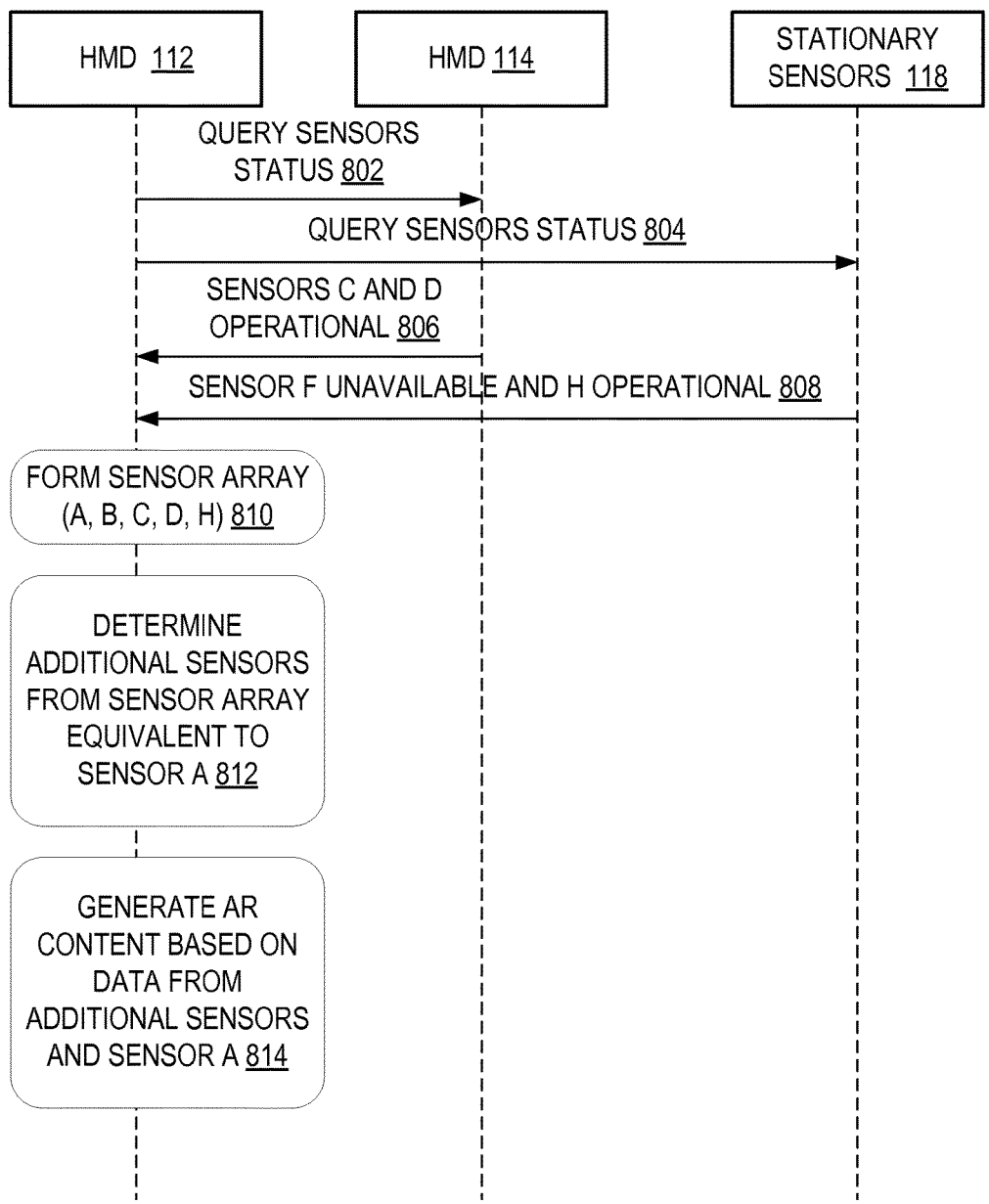
FIG. 8 is an interaction diagram illustrating a second example embodiment of an operation of a dynamic sensor array.

FIG. 8 is an interaction diagram illustrating a second example embodiment of an operation of a dynamic sensor array. At operations 802 and 804, HMD 112 queries the status of sensors from HMD 114 and stationary sensors 118 located nearby. At operation 806, HMD 112 receives a communication from HMD 114 indicating that sensor c and d of HMD 114 are operational. At operation 808, HMD 112 receives a communication from stationary sensors 118 indicating that sensor f is unavailable and sensor h is operational. At operation 810, HMD 112 forms a sensor array based on sensors a, b, c, d, and h. At operation 812, HMD 112 identifies one or more sensors (also referred to as additional/enhanced sensors) from the sensor array that performs a function equivalent to that of sensor a. At operation 814, HMD 112 accesses data from the identified enhanced sensors and generate AR content based on data from the identified enhanced sensors in addition to data from sensor a. In one example embodiment, operations 802, 804, 810, 812, and 814 may be implemented with the enhanced sensor module 404 and the AR application 212 of HMD 112.

Figure 9:
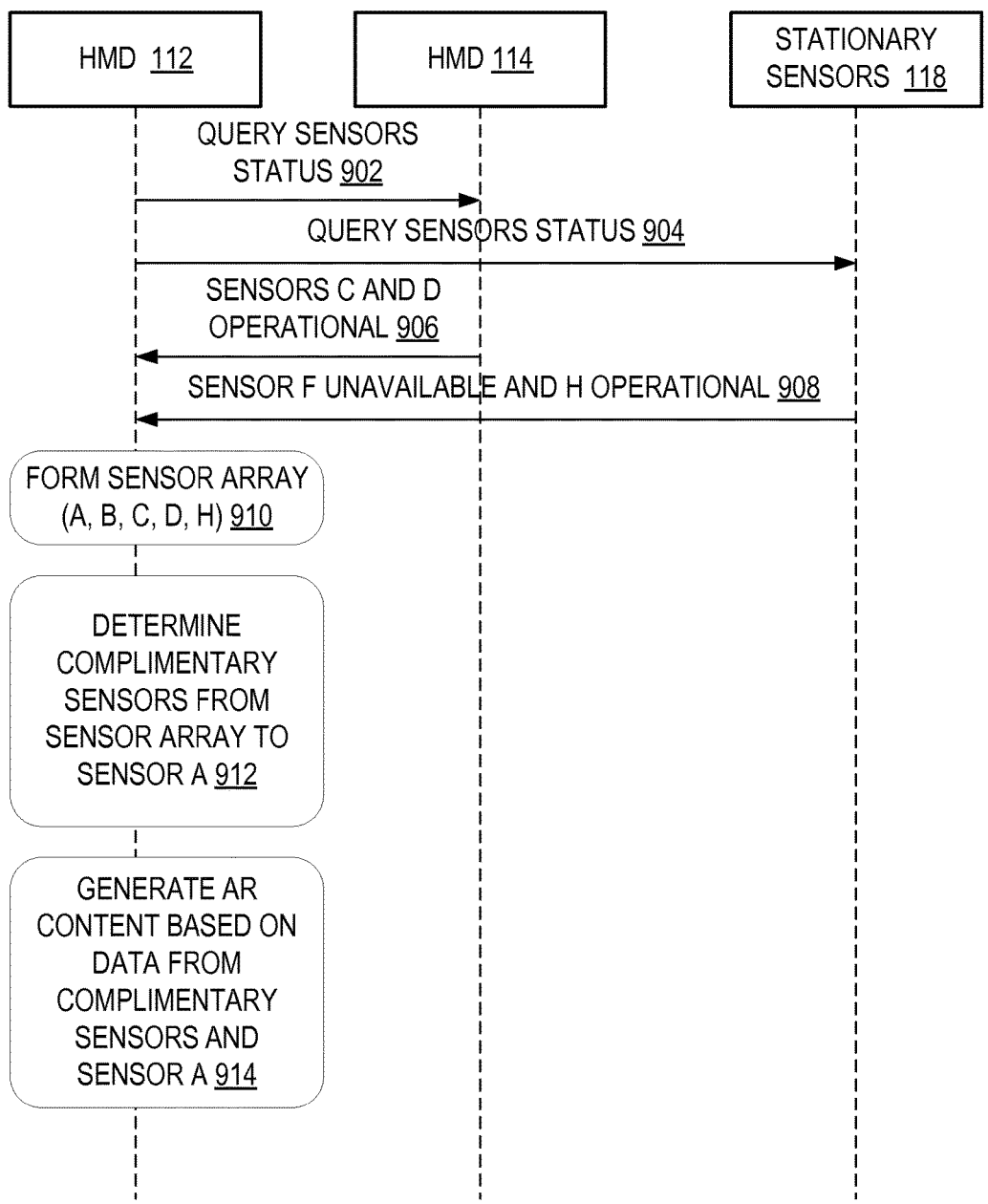
FIG. 9 is an interaction diagram illustrating a third example embodiment of an operation of a dynamic sensor array.

FIG. 9 is an interaction diagram illustrating a third example embodiment of an operation of a dynamic sensor array. At operation 902, HMD 112 queries the status of sensors from HMD 114 and stationary sensors 118 located nearby at operations 902 and 904. At operation 906, HMD 112 receives a communication from HMD 114 indicating that sensor c and d of HMD 114 are operational. At operation 908, HMD 112 receives a communication from stationary sensors 118 indicating that sensor f is unavailable and sensor h is operational. At operation 910, HMD 112 forms a sensor array based on sensors a, b, c, d, and h. At operation 912, HMD 112 identifies one or more sensors (also referred to as complementary sensors) from the sensor array that performs a function different from sensor a. At operation 914, HMD 112 accesses data from the identified complementary sensors and generate AR content based on data from the identified complementary sensors in addition to data from sensor a. In one example embodiment, operations 902, 904, 910, 912, and 914 may be implemented with the complementary sensor module 406 and the AR application 212 of HMD 112.

Figure 10:
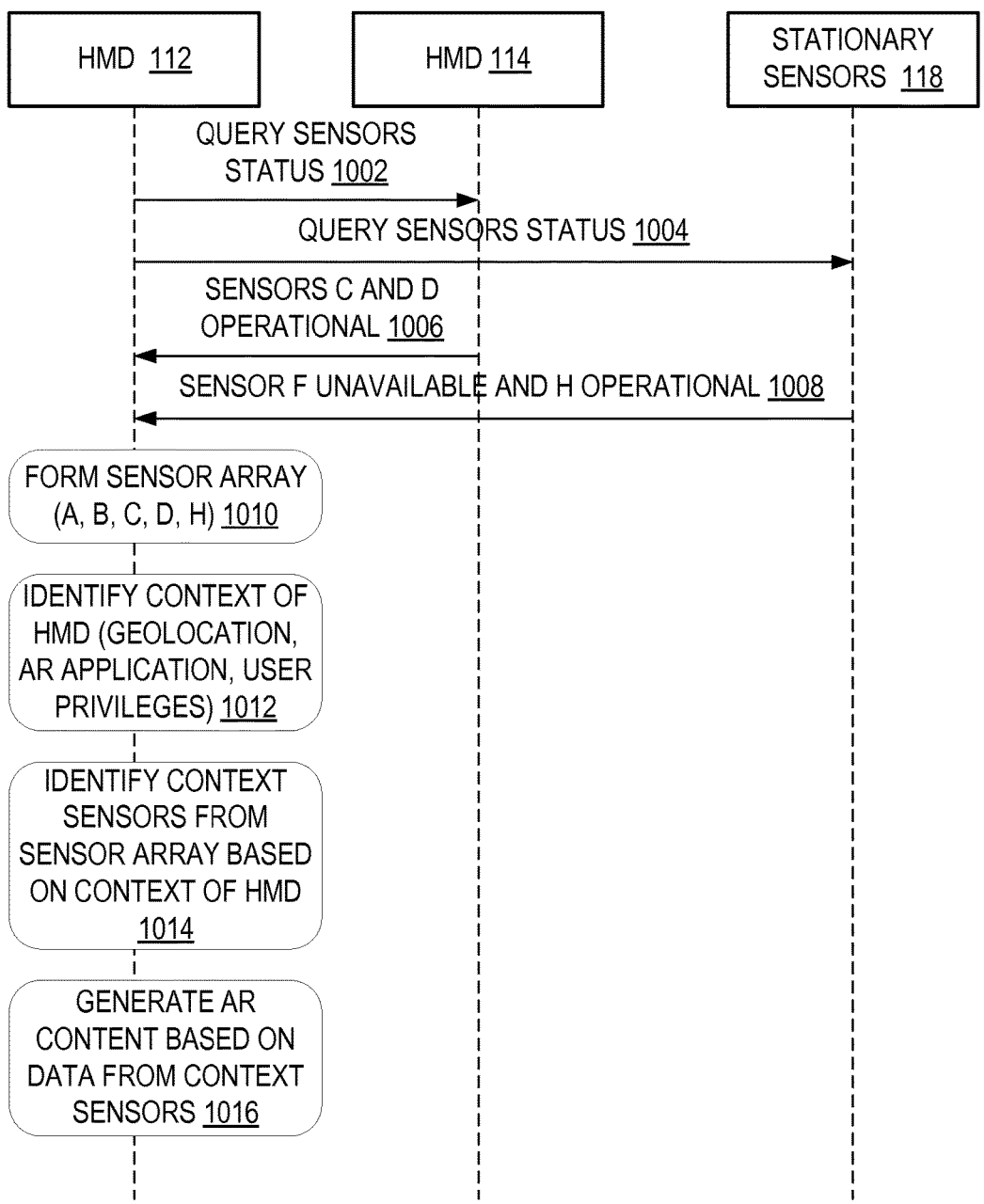
FIG. 10 is an interaction diagram illustrating a fourth example embodiment of an operation of a dynamic sensor array.

FIG. 10 is an interaction diagram illustrating a fourth example embodiment of an operation of a dynamic sensor array. At operation 1002, HMD 112 queries the status of sensors from HMD 114 and stationary sensors 118 located nearby at operations 1002 and 1004. At operation 1006, HMD 112 receives a communication from HMD 114 indicating that sensor c and d of HMD 114 are operational. At operation 1008, HMD 112 receives a communication from stationary sensors 118 indicating that sensor f is unavailable and sensor h is operational. At operation 1010, HMD 112 forms a sensor array based on sensors a, b, c, d, and h. At operation 1012, HMD 112 identifies a context of the HMD 112. The context may be based on a geolocation of the HMD 112, a task selected in the AR application 212, privileges or profile of the user 102 of the HMD 112. At operation 1014, HMD 112 identifies one or more sensors (also referred to as context sensors) from the sensor array based on the context of the HMD 112 (e.g., sensors a and b are associated with a building). At operation 1014, HMD 112 accesses data from the identified context sensors and generate AR content based on data from the identified context sensors. In one example embodiment, operations 1002, 1004, 1010, 1012, 1014, and 1016 may be implemented with the context sensor module 408 and the AR application 212 of HMD 112.

Figure 11:
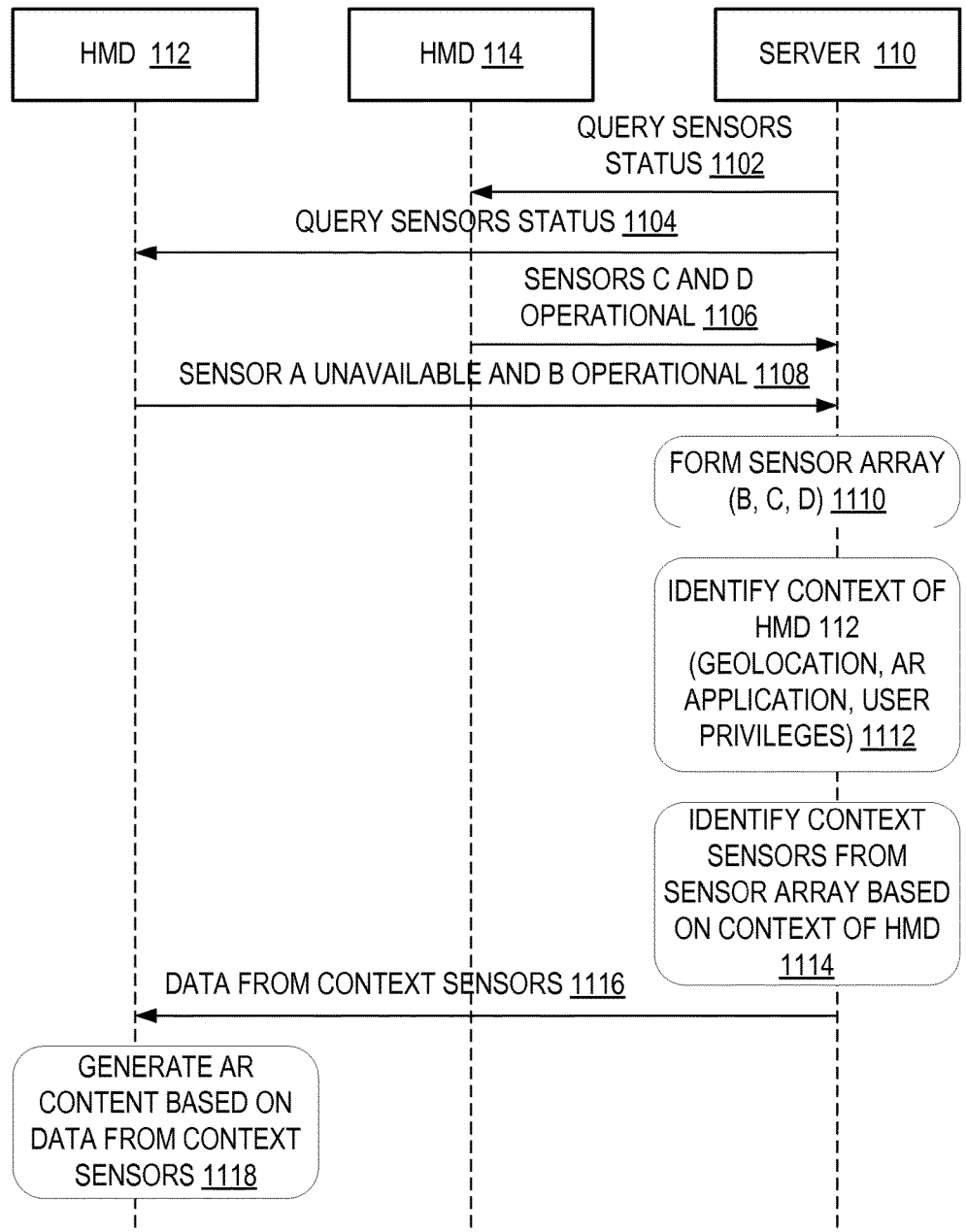
FIG. 11 is an interaction diagram illustrating a fifth example embodiment of an operation of a dynamic sensor array.

FIG. 11 is an interaction diagram illustrating a fifth example embodiment of an operation of a dynamic sensor array. At operation 1102, server 110 queries the status of sensors from HMDs 112 and 114 (both located within a same building or floor) at operations 1102 and 1104. At operation 1106, server 110 112 receives a communication from HMD 114 indicating that sensor c and d of HMD 114 are operational. At operation 1108, server 110 receives a communication from HMD 112 indicating that sensor a is unavailable and sensor b is operational. At operation 1110, server 110 generates a sensor array that includes sensors a, b, c, d, and h. At operation 1112, server 110 identifies a context of the HMD 112. The context may be based on a geolocation of the HMD 112, a task selected in the AR application 212, privileges or profile of the user 102 of the HMD 112. At operation 1114, server 110 identifies one or more sensors (also referred to as context sensors) from the sensor array based on the context of the HMD 112. At operation 1114, server 110 accesses and provides data from the identified context sensors to the HMD 112. At operation 1118, the HMD 112 generates AR content based on data from the identified context sensors. In one example embodiment, operations 1102, 1104, 1110, 1112, 1114, and 1116 may be implemented with the sensor array management module 306 and the AR application 212 of HMD 112.

Figure 12:
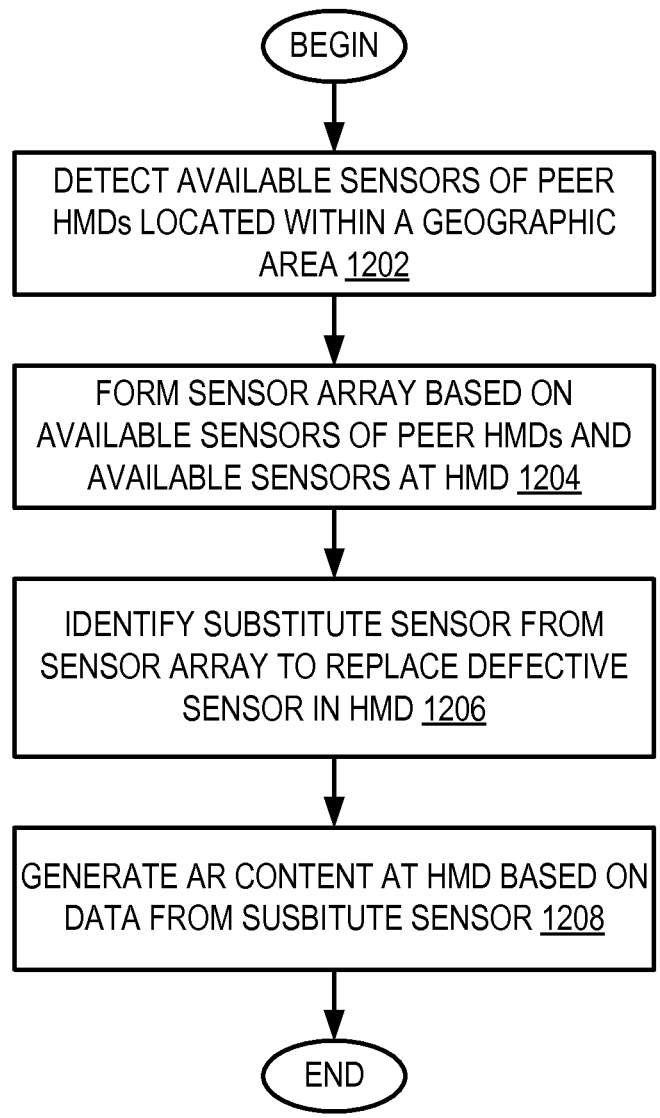
FIG. 12 is a flowchart illustrating a first example operation of a dynamic sensor array.

FIG. 12 is a flowchart illustrating a first example operation of a dynamic sensor array. At operation 1202, available sensors of peer HMDs located within a same or different geographic area are detected and identified. In one example embodiment, operation 1202 may be implemented with the peer sensors detection module 302.

At operation 1204, a sensor array is formed based on available sensors of peer HMDs and available sensors at the HMD. In one example embodiment, operation 1202 may be implemented with the sensor array forming module 304.

At operation 1206, a defective sensor in the HMD is identified and a substitute sensor from the sensor array is identified. In one example embodiment, operation 1206 may be implemented with the defective sensor module 402.

At operation 1208, AR content is generated at the HMD based on data from the substitute sensor. In one example embodiment, operation 1208 may be implemented with the AR application 212.

Figure 13:
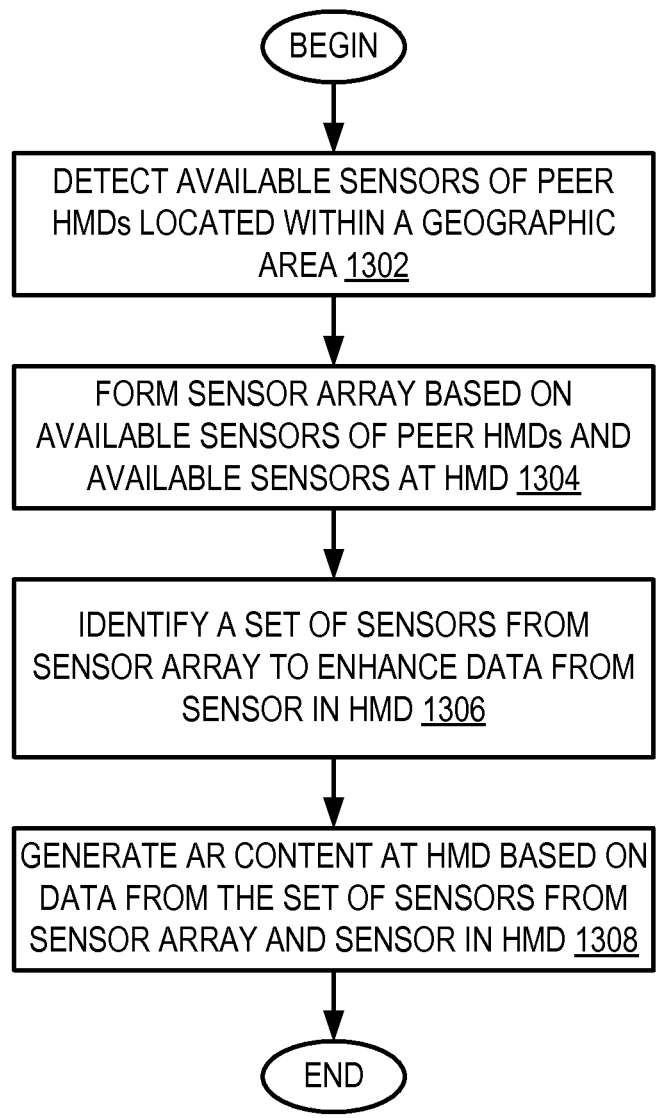
FIG. 13 is a flowchart illustrating a second example operation of a dynamic sensor array.

FIG. 13 is a flowchart illustrating a second example operation of a dynamic sensor array. At operation 1302, available sensors of peer HMDs located within a same or different geographic area are detected and identified. In one example embodiment, operation 1302 may be implemented with the peer sensors detection module 302.

At operation 1304, a sensor array is formed based on available sensors of peer HMDs and available sensors at the HMD. In one example embodiment, operation 1302 may be implemented with the sensor array forming module 304.

At operation 1306, an operational sensor in the HMD is identified and another sensor from the sensor array (e.g., additional/enhanced sensor) similar to the operational sensor in the HMD is identified to enhance data from the operational sensor in the HMD. In one example embodiment, operation 1306 may be implemented with the enhanced sensor module 404.

At operation 1308, AR content is generated at the HMD based on data from the additional/enhanced sensor. In one example embodiment, operation 1308 may be implemented with the AR application 212.

Figure 14:
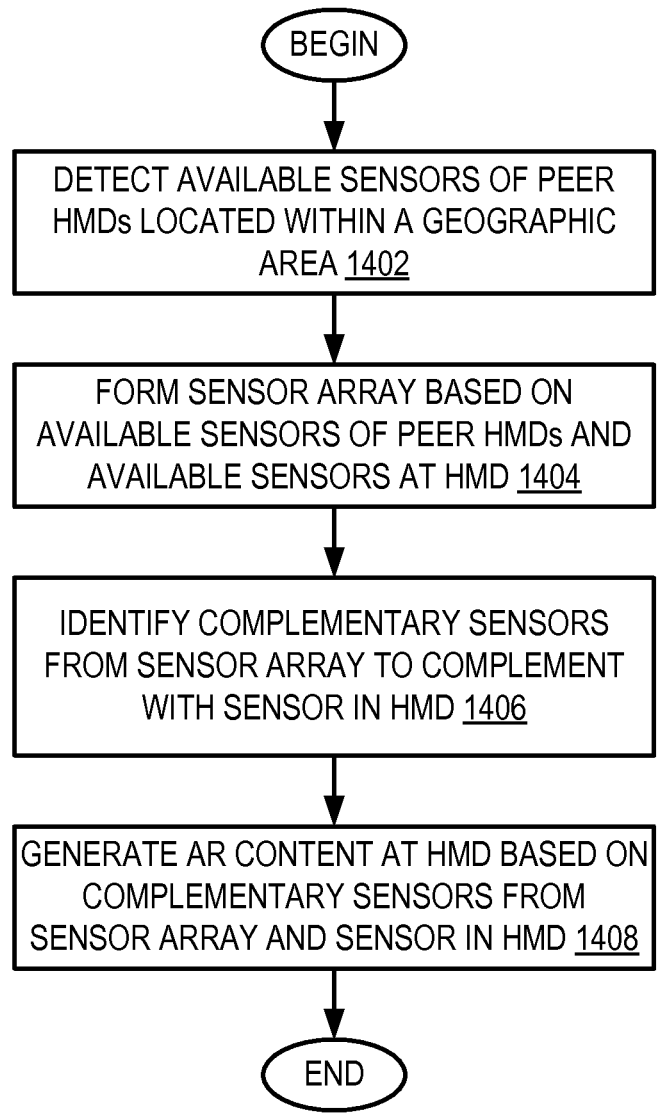
FIG. 14 is a flowchart illustrating a third example operation of a dynamic sensor array.

FIG. 14 is a flowchart illustrating a third example operation of a dynamic sensor array. At operation 1402, available sensors of peer HMDs located within a same or different geographic area are detected and identified. In one example embodiment, operation 1402 may be implemented with the peer sensors detection module 302.

At operation 1404, a sensor array is formed based on available sensors of peer HMDs and available sensors at the HMD. In one example embodiment, operation 1402 may be implemented with the sensor array forming module 304.

At operation 1406, an operational sensor in the HMD is identified and another sensor from the sensor array (e.g., complementary sensors) different from the operational sensor in the HMD is identified to complement the operational sensor (e.g., temperature sensor complements humidity sensor). In one example embodiment, operation 1406 may be implemented with the complementary sensor module 406.

At operation 1408, AR content is generated at the HMD based on data from the complementary sensors. In one example embodiment, operation 1408 may be implemented with the AR application 212.

Figure 15:
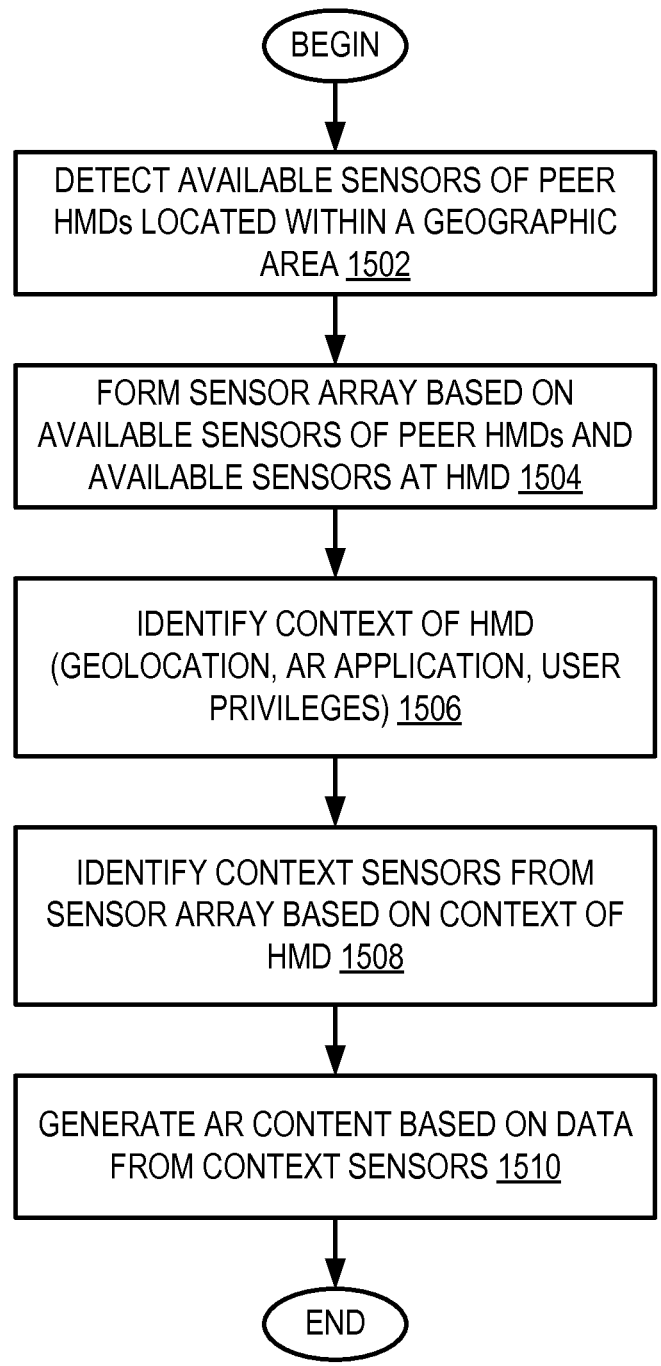
FIG. 15 is a flowchart illustrating a fourth example operation of a dynamic sensor array.

FIG. 15 is a flowchart illustrating a fourth example operation of a dynamic sensor array. At operation 1502, available sensors of peer HMDs located within a same or different geographic area are detected and identified. In one example embodiment, operation 1502 may be implemented with the peer sensors detection module 302.

At operation 1504, a sensor array is formed based on available sensors of peer HMDs and available sensors at the HMD. In one example embodiment, operation 1502 may be implemented with the sensor array forming module 304.

At operation 1506, the context of the HMD is identified. In one example embodiment, operation 1506 may be implemented with the context sensor module 408.

At operation 1508, context sensors are identified from the sensor array based on the context of the HMD. In one example embodiment, operation 1508 may be implemented with the context sensor module 408.

At operation 1510, AR content is generated at the HMD based on data from the context sensors. In one example embodiment, operation 1510 may be implemented with the AR application 212.

Figure 16:
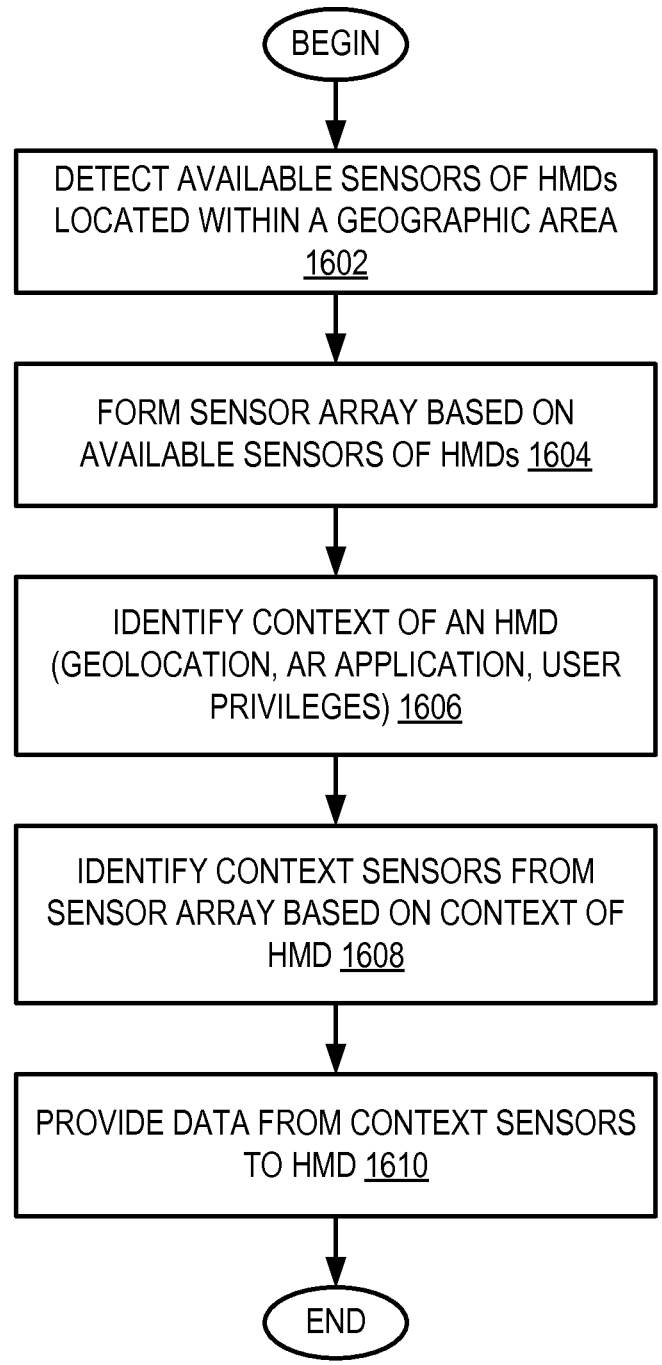
FIG. 16 is a flowchart illustrating a fifth example operation of a dynamic sensor array.

FIG. 16 is a flowchart illustrating a fifth example operation of a dynamic sensor array. At operation 1602, available sensors of HMDs located within a same or different geographic area are detected and identified. In one example embodiment, operation 1502 may be implemented with the sensor status module 602 of the server 110.

At operation 1604, a sensor array is formed based on available sensors of the HMDs. In one example embodiment, operation 1602 may be implemented with the sensor array forming module 304.

At operation 1606, the context of an HMD is identified. In one example embodiment, operation 1606 may be implemented with the context sensor module 408 of the HMD.

At operation 1608, context sensors are identified from the sensor array based on the context of the HMD. In one example embodiment, operation 1508 may be implemented with the context sensor module 408.

At operation 1610, data from the context sensors are provided to the HMD to generate AR content. In one example embodiment, operation 1610 may be implemented with the sensor array management module 306 of server 110.

Example Machine

Figure 17:
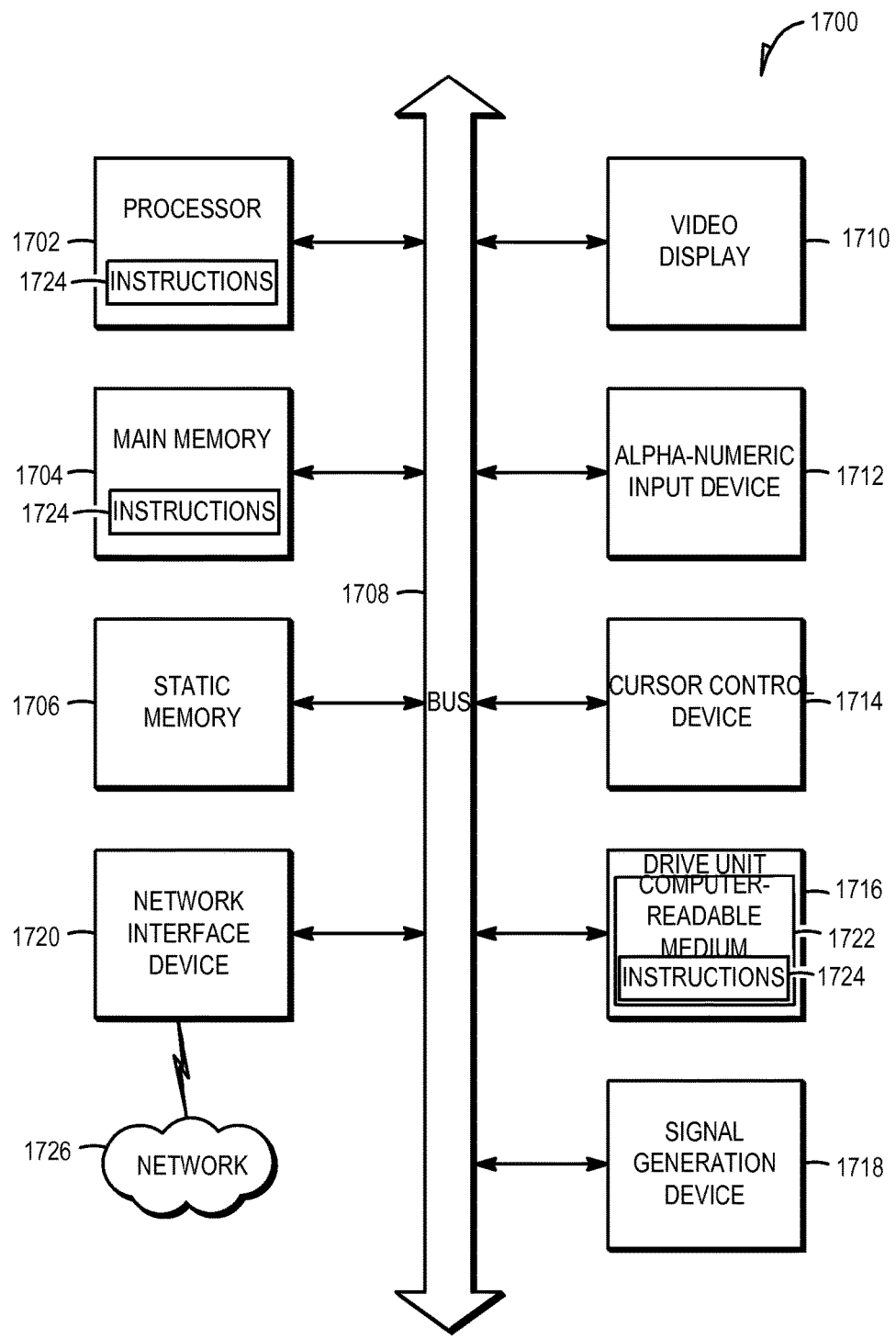
FIG. 17 is a block diagram illustrating components of a machine, according to some example embodiments, able to read instructions from a machine-readable medium and perform any one or more of the methodologies discussed herein.

FIG. 17 is a block diagram illustrating components of a machine 1700, according to some example embodiments, able to read instructions 1724 from a machine-readable medium 1722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 17 shows the machine 1700 in the example form of a computer system (e.g., a computer) within which the instructions 1724 (e.g., software, a program, an application, an applet, an app, or other executable code) for causing the machine 1700 to perform any one or more of the methodologies discussed herein may be executed, in whole or in part.

In alternative embodiments, the machine 1700 operates as a standalone device or may be communicatively coupled (e.g., networked) to other machines. In a networked deployment, the machine 1700 may operate in the capacity of a server machine or a client machine in a server-client network environment, or as a peer machine in a distributed (e.g., peer-to-peer) network environment. The machine 1700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1724, sequentially or otherwise, that specify actions to be taken by that machine. Further, while only a single machine is illustrated, the term "machine" shall also be taken to include any collection of machines that individually or jointly execute the instructions 1742 to perform all or part of any one or more of the methodologies discussed herein.

The machine 1700 includes a processor 1702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1704, and a static memory 1706, which are configured to communicate with each other via a bus 1708. The processor 1702 contains solid-state digital microcircuits (e.g., electronic, optical, or both) that are configurable, temporarily or permanently, by some or all of the instructions 1724 such that the processor 1702 is configurable to perform any one or more of the methodologies described herein, in whole or in part. For example, a set of one or more microcircuits of the processor 1702 may be configurable to execute one or more modules (e.g., software modules) described herein. In some example embodiments, the processor 1702 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 1700 with at least the processor 1702, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1700 may further include a graphics display 1710 (e.g., a plasma display panel (PDP), a light emitting diode (LED) display, a liquid crystal display (LCD), a projector, a cathode ray tube (CRT), or any other display capable of displaying graphics or video). The machine 1700 may also include an alphanumeric input device 1712 (e.g., a keyboard or keypad), a cursor input device 1714 (e.g., a mouse, a touchpad, a trackball, a joystick, a motion sensor, an eye tracking device, or other pointing instrument), a data storage 1716, an audio generation device 1718 (e.g., a sound card, an amplifier, a speaker, a headphone jack, or any suitable combination thereof), and a network interface device 1720.

The data storage 1716 (e.g., a data storage device) includes the machine-readable medium 1722 (e.g., a tangible and non-transitory machine-readable storage medium) on which are stored the instructions 1724 embodying any one or more of the methodologies or functions described herein. The instructions 1724 may also reside, completely or at least partially, within the main memory 1704, within the processor 1702 (e.g., within the processor's cache memory), or both, before or during execution thereof by the machine 1700. Accordingly, the main memory 1704 and the processor 1702 may be considered machine-readable media (e.g., tangible and non-transitory machine-readable media). The instructions 1724 may be transmitted or received over the network 190 via the network interface device 1720. For example, the network interface device 1720 may communicate the instructions 1724 using any one or more transfer protocols (e.g., hypertext transfer protocol (HTTP)).

In some example embodiments, the machine 1700 may be a portable computing device (e.g., a smart phone, tablet computer, or a wearable device), and have one or more additional input components 1730 (e.g., sensors or gauges). Examples of such input components 1730 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1724 for execution by the machine 1700, such that the instructions 1724, when executed by one or more processors of the machine 1700 (e.g., processor 1702), cause the machine 1700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1724 for execution by the machine 1700 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1724).

Example Mobile Device

Figure 18:
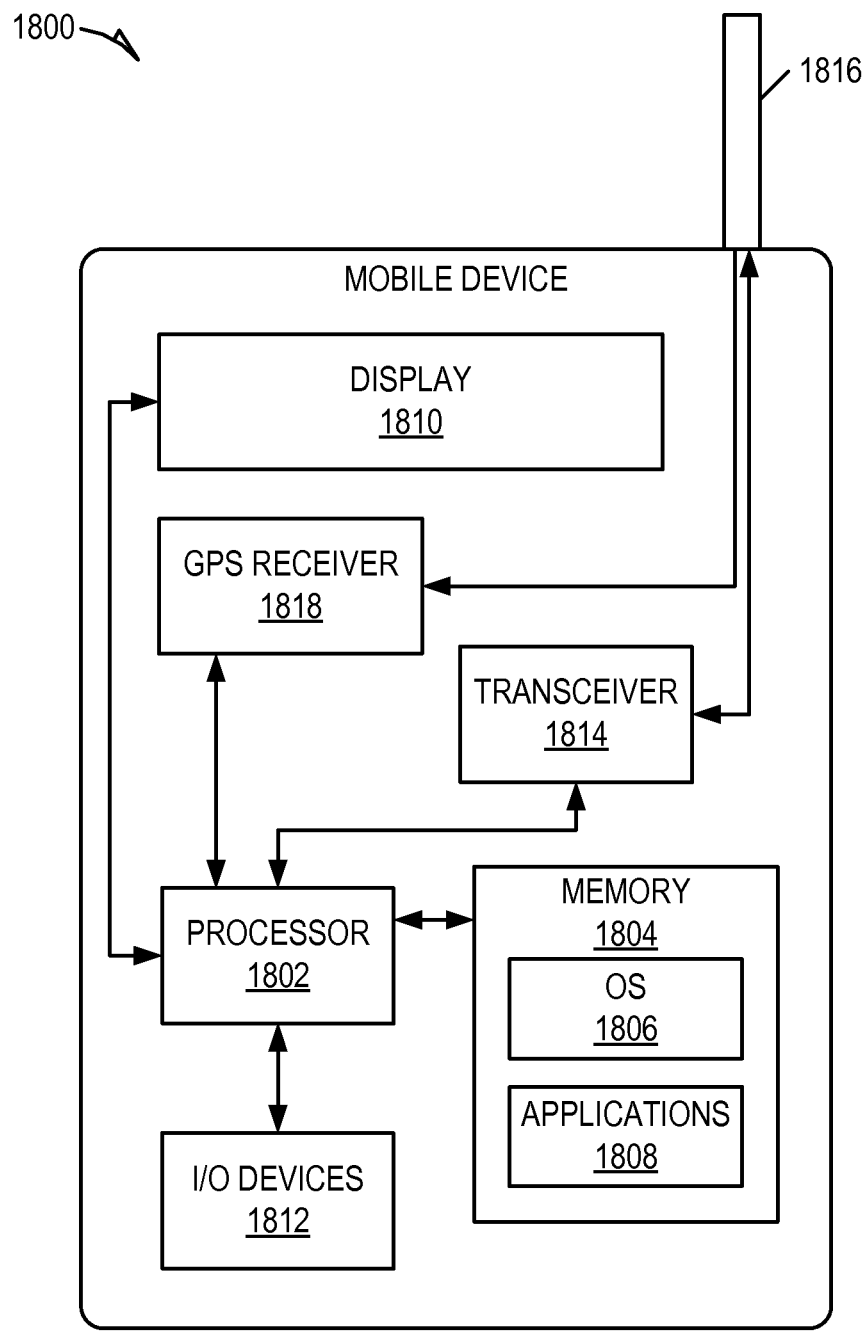
FIG. 18 is a block diagram illustrating a mobile device, according to an example embodiment.

FIG. 18 is a block diagram illustrating a mobile device 1800, according to an example embodiment. The mobile device 1800 may include a processor 1802. The processor

1802 may be any of a variety of different types of commercially available processors 1802 suitable for mobile devices 1800 (for example, an XScale architecture microprocessor, a microprocessor without interlocked pipeline stages (MIPS) architecture processor, or another type of processor 1802). A memory 1804, such as a random access memory (RAM), a flash memory, or other type of memory, is typically accessible to the processor 1802. The memory 1804 may be adapted to store an operating system (OS) 1806, as well as application programs 1808, such as a mobile location enabled application that may provide LBSs to a user 102. The processor 1802 may be coupled, either directly or via appropriate intermediary hardware, to a display 1810 and to one or more input/output (I/O) devices 1812, such as a keypad, a touch panel sensor, a microphone, and the like. Similarly, in some embodiments, the processor 1802 may be coupled to a transceiver 1814 that interfaces with an antenna 1816. The transceiver 1814 may be configured to both transmit and receive cellular network signals, wireless data signals, or other types of signals via the antenna 1816, depending on the nature of the mobile device 1800. Further, in some configurations, a GPS receiver 1818 may also make use of the antenna 1816 to receive GPS signals.

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a head mounted device comprising:
one or more sensors;
one or more processors comprising an augmented reality (AR) application and a sensor array module,
the sensor array module configured to identify available sensors from a plurality of other head mounted devices that are geographically located within a predefined area, to form a dynamic sensor array based on the available sensors and the one or more sensors, and to update the dynamic sensor array based on an operational status of the available sensors and the one or more sensors,
the AR application configured to generate AR content based on data from the dynamic sensor array; and
a display configured to display the AR content.

A second embodiment provides a head mounted device according to the first embodiment, wherein the sensor array module is configured to:
identify a defective sensor in the head mounted device,
identify a replacement sensor from the dynamic sensor array, the replacement sensor including a sensor of the plurality of other head mounted devices, the replacement sensor performing a function similar to the defective sensor, and
access data from the replacement sensor,
wherein the AR application is configured to generate the AR content based on data from the replacement sensor and the one or more sensors of the head mounted device.

A third embodiment provides a head mounted device according to the first embodiment, wherein the sensor array module is configured to:
identify an additional sensor from the dynamic sensor array, the additional sensor including a sensor of the plurality of other head mounted devices, the additional sensor performing a function similar to the one or more sensors in the head mounted device, and
access data from the additional sensor,
wherein the AR application is configured to generate the AR content based on data from the additional sensor and the one or more sensors of the head mounted device.

A fourth embodiment provides a head mounted device according to the first embodiment, wherein the sensor array module is configured to:
identify a complimentary sensor from the dynamic sensor array, the complimentary sensor including a sensor of the plurality of other head mounted devices, the complimentary sensor performing a function different from the one or more sensors in the head mounted device, and
access data from the complimentary sensor,
wherein the AR application is configured to generate the AR content based on data from the complimentary sensor and the one or more sensors of the head mounted device.

A fifth embodiment provides a head mounted device according to the first embodiment, wherein the sensor array module is configured to:
identify a context of the head mounted device,
identify a context sensor from the dynamic sensor array, the context sensor including a sensor of the plurality of other head mounted devices, the context sensor identified based on the context of the head mounted device, and
access data from the context sensor,
wherein the AR application is configured to generate the AR content based on data from the context sensor and the one or more sensors of the head mounted device.

A sixth embodiment provides a head mounted device according to the fifth embodiment, wherein the context include a predefined geographic location,
wherein the AR application is configured to generate the AR content in response to detecting that the head mounted device is located or approaching the predefined geographic location.

A seventh embodiment provides a head mounted device according to the fifth embodiment, wherein the context include a task of the AR application,
wherein the AR application is configured to generate the AR content in response to detecting a selection of the task in the head mounted device.

An eighth embodiment provides a head mounted device according to the fifth embodiment, wherein the context include a user privilege,
wherein the AR application is configured to generate the AR content based on the user privilege.

A ninth embodiment provides a head mounted device according to the first embodiment, wherein the sensor array module is configured to identify a plurality of stationary sensors located within the predefined area, the plurality of stationary sensors external to the plurality of other head mounted devices, and to form the dynamic sensor array based on the plurality of stationary sensors, the available sensors from the plurality of other head mounted devices, and the one or more sensors of the head mounted device.

A tenth embodiment provides a head mounted device according to the first embodiment, wherein the sensor array module is configured to identify one or more sensors from the dynamic sensor array based on a physical object captured with a camera of the head mounted device, the dynamic array including a plurality of stationary sensors external to both the plurality of other head mounted devices and the head mounted device, and to access data from the identified one or more sensors from the dynamic sensor array,
wherein the AR application is configured to generate the AR content based on the data from the identified one or more sensors from the dynamic sensor array.

An eleventh embodiment provides a server comprising:
one or more processors comprising a sensor array module, the sensor array module configured to:
identify a plurality of head mounted devices geographically located within a predefined area,
identify available sensors from the plurality of head mounted devices,
form a dynamic sensor array based on the available sensors,
update the dynamic sensor array based on an operational status of the available sensors, and
provide data from the dynamic sensor array to a first head mounted device, the first head mounted device configured to generate AR content based on the data from the dynamic sensor array.

A twelfth embodiment provides a server according to the eleventh embodiment, wherein the sensor array module is configured to:
identify a defective sensor in the first head mounted device,
identify a replacement sensor from the dynamic sensor array, the replacement sensor including a sensor of the plurality of head mounted devices, the replacement sensor performing a function similar to the defective sensor, and
access and provide data from the replacement sensor to the first head mounted device.

A thirteenth embodiment provides a server according to the eleventh embodiment, wherein the sensor array module is configured to:
identify an additional sensor from the dynamic sensor array, the additional sensor including a sensor of the plurality of head mounted devices, the additional sensor performing a function similar to a sensor in the first head mounted device, and
access and provide data from the additional sensor to the first head mounted device.

A fourteenth embodiment provides a server according to the eleventh embodiment, wherein the sensor array module is configured to:
identify a complimentary sensor from the dynamic sensor array, the complimentary sensor including a sensor of the head mounted devices, the complimentary sensor performing a function different from a sensor in the first head mounted device, and
access and provide data from the complimentary sensor to the first head mounted device.

A fifteenth embodiment provides a server according to the eleventh embodiment, wherein the sensor array module is configured to:
identify a context of the first head mounted device,
identify a context sensor from the dynamic sensor array, the context sensor including a sensor of the plurality of head mounted devices, the context sensor identified based on the context of the first head mounted device, and
access and provide data from the context sensor to the first head mounted device.

A sixteenth embodiment provides a method (e.g., a dynamic sensor array generating method) comprising:
identifying a plurality of head mounted devices geographically located within a predefined area;
identifying available sensors from the plurality of head mounted devices;
forming, using a hardware processor of a computer, a dynamic sensor array based on the available sensors;
updating the dynamic sensor array based on an operational status of the available sensors; and
providing data from the dynamic sensor array to a first head mounted device, the first head mounted device configured to generate AR content based on the data from the dynamic sensor array.

A seventeenth embodiment provides a method according to the sixteenth embodiment, further comprising:
identifying a defective sensor in the first head mounted device;
identifying a replacement sensor from the dynamic sensor array, the replacement sensor including a sensor of the plurality of head mounted devices, the replacement sensor performing a function similar to the defective sensor; and
accessing and providing data from the replacement sensor to the first head mounted device.

An eighteenth embodiment provides a method according to the sixteenth embodiment, further comprising:
identifying an additional sensor from the dynamic sensor array, the additional sensor including a sensor of the plurality of head mounted devices, the additional sensor performing a function similar to a sensor in the first head mounted device; and
accessing and providing data from the additional sensor to the first head mounted device.

A nineteenth embodiment provides a method according to the sixteenth embodiment, further comprising:
identifying a complimentary sensor from the dynamic sensor array, the complimentary sensor including a sensor of the head mounted devices, the complimentary sensor performing a function different from a sensor in the first head mounted device; and
accessing and providing data from the complimentary sensor to the first head mounted device.

A twentieth embodiment provides a method according to the sixteenth embodiment, further comprising:
identifying a context of the first head mounted device;
identifying a context sensor from the dynamic sensor array, the context sensor including a sensor of the plurality of head mounted devices, the context sensor identified based on the context of the first head mounted device; and
accessing and providing data from the context sensor to the first head mounted device.

What is claimed is:

1. A head mounted device comprising:
one or more sensors;
one or more processors comprising an augmented reality (AR) application and a sensor array module;
the sensor array module configured to:
identify a sensor, in the one or more sensors of the head mounted device, as being a defective sensor;
in response to the identifying the defective sensor, identify sensors included by a plurality of other head mounted devices that are geographically located within a predefined area and that are operational;
form a dynamic sensor array that includes the identified sensors of the plurality of other head mounted devices and includes the one or more sensors of the head mounted device;
identify an operating sensor, in the dynamic sensor array, that is configured to perform a function similar to the defective sensor;
update the dynamic sensor array by excluding the defective sensor from the dynamic sensor array;
the AR application configured to generate AR content based on data from the dynamic sensor array; and
a display configured to display the AR content.

2. The head mounted device of claim 1, wherein the sensor array module is configured to:
identify an additional sensor from the dynamic sensor array, the additional sensor including a sensor of the plurality of other head mounted devices, the additional sensor performing a function similar to the one or more sensors in the head mounted device, and
access data from the additional sensor,
wherein the AR application is configured to generate the AR content based on data from the additional sensor and the one or more sensors of the head mounted device.

3. The head mounted device of claim 1, wherein the sensor array module is configured to:
identify a complimentary sensor from the dynamic sensor array, the complimentary sensor including a sensor of the plurality of other head mounted devices, the complimentary sensor performing a function different from the one or more sensors in the head mounted device, and
access data from the complimentary sensor,
wherein the AR application is configured to generate the AR content based on data from the complimentary sensor and the one or more sensors of the head mounted device.

4. The head mounted device of claim 1, wherein the sensor array module is configured to:
identify a context of the head mounted device,
identify a context sensor from the dynamic sensor array, the context sensor including a sensor of the plurality of other head mounted devices, the context sensor identified based on the context of the head mounted device, and
access data from the context sensor,
wherein the AR application is configured to generate the AR content based on data from the context sensor and the one or more sensors of the head mounted device.

5. The head mounted device of claim 4, wherein the context include a predefined geographic location,
wherein the AR application is configured to generate the AR content in response to detecting that the head mounted device is located or approaching the predefined geographic location.

6. The head mounted device of claim 4, wherein the context include a task of the AR application,
wherein the AR application is configured to generate the AR content in response to detecting a selection of the task in the head mounted device.

7. The head mounted device of claim 4, wherein the context include a user privilege,
wherein the AR application is configured to generate the AR content based on the user privilege.

8. The head mounted device of claim 1, wherein the sensor array module is configured to identify a plurality of stationary sensors located within the predefined area, the plurality of stationary sensors being external to any head mounted device, and to form the dynamic sensor array based on the plurality of stationary sensors, the available sensors from the plurality of other head mounted devices, and the one or more sensors of the head mounted device.

9. The head mounted device of claim 1, wherein the sensor array module is configured to identify one or more sensors from the dynamic sensor array based on a physical object captured with a camera of the head mounted device, the dynamic array including a plurality of stationary sensors being external to any head mounted device, and to access data from the identified one or more sensors from the dynamic sensor array,
wherein the AR application is configured to generate the AR content based on the data from the identified one or more sensors from the dynamic sensor array.

10. A server comprising:
one or more processors comprising a sensor array module;
the sensor array module configured to:
identify a sensor, in the one or more sensors of the head mounted device, as being a defective sensor;
in response to the identifying the defective sensor, identify sensors included by a plurality of other head mounted devices that are geographically located within a predefined area and that are operational;
form a dynamic sensor array that includes the identified sensors of the plurality of other head mounted devices and includes the one or more sensors of the head mounted device;
identify an operating sensor, in the dynamic sensor array, that is configured to perform a function similar to the defective sensor;
update the dynamic sensor array by excluding the defective sensor from the dynamic sensor array;
provide data from the dynamic sensor array to a first head mounted device, the first head mounted device configured to generate AR content based on the data from the dynamic sensor array.

11. The server of claim 10, wherein the sensor array module is configured to:
identify an additional sensor from the dynamic sensor array, the additional sensor including a sensor of the plurality of head mounted devices, the additional sensor performing a function similar to a sensor in the first head mounted device, and
access and provide data from the additional sensor to the first head mounted device.

12. The server of claim 10, wherein the sensor array module is configured to:
identify a complimentary sensor from the dynamic sensor array, the complimentary sensor including a sensor of the plurality of head mounted devices, the complimentary sensor performing a function different from a sensor in the first head mounted device, and access and provide data from the complimentary sensor to the first head mounted device.

13. The server of claim 10, wherein the sensor array module is configured to:
identify a context of the first head mounted device,
identify a context sensor from the dynamic sensor array, the context sensor including a sensor of the plurality of head mounted devices, the context sensor identified based on the context of the first head mounted device, and
access and provide data from the context sensor to the first head mounted device.

14. A computer-implemented method comprising:
identifying a plurality of head mounted devices geographically located within a predefined area;
identifying sensors included by the plurality of head mounted devices;
forming, using a hardware processor of a computer, a dynamic sensor array that includes the identified sensors;
identifying a non-operating sensor and an operating sensor in the dynamic sensor array;
determining that the operating sensor and the non-operating sensor each include a same sensor that is configured to generate a same type of data;
updating the dynamic sensor array by excluding the non-operating sensor from the dynamic sensor array in response to the determining; and
providing data from the dynamic sensor array to a first head mounted device, the first head mounted device configured to generate AR content based on the data from the dynamic sensor array.

15. The computer-implemented method of claim 14, further comprising:
identifying a defective sensor in the first head mounted device;
identifying a replacement sensor from the dynamic sensor array, the replacement sensor including a sensor of the plurality of head mounted devices, the replacement sensor performing a function similar to the defective sensor; and
accessing and providing data from the replacement sensor to the first head mounted device.

16. The computer-implemented method of claim 14, further comprising:
identifying an additional sensor from the dynamic sensor array, the additional sensor including a sensor of the plurality of head mounted devices, the additional sensor performing a function similar to a sensor in the first head mounted device; and
accessing and providing data from the additional sensor to the first head mounted device.

17. The computer-implemented method of claim 14, further comprising:
identifying a complimentary sensor from the dynamic sensor array, the complimentary sensor including a sensor of the plurality of head mounted devices, the complimentary sensor performing a function different from a sensor in the first head mounted device; and
accessing and providing data from the complimentary sensor to the first head mounted device.

18. The computer-implemented method of claim 14, further comprising:
identifying a context of the first head mounted device;
identifying a context sensor from the dynamic sensor array, the context sensor including a sensor of the plurality of head mounted devices, the context sensor identified based on the context of the first head mounted device; and
accessing and providing data from the context sensor to the first head mounted device.

19. A non-transitory machine-readable medium comprising instructions that, when executed by one or more processors of a machine, cause the machine to perform operations comprising:
identifying a sensor, in one or more sensors of a head mounted device, as being a defective sensor;
in response to the identifying the defective sensor, identifying sensors included by a plurality of other head mounted devices that are geographically located within a predefined area and that are operational;
forming a dynamic sensor array that includes the identified sensors of the plurality of other head mounted devices and includes the one or more sensors of the head mounted device;
identifying an operating sensor, in the dynamic sensor array, that is configured to perform a function similar to the defective sensor;
updating the dynamic sensor array by excluding the defective sensor from the dynamic sensor array;
providing data from the dynamic sensor array to a first head mounted device, the first head mounted device configured to generate AR content based on the data from the dynamic sensor array.

* * * * *